(12) United States Patent
Ishitobi

(10) Patent No.: US 7,810,877 B2
(45) Date of Patent: Oct. 12, 2010

(54) AUTOMOBILE HOOD

(75) Inventor: Hideki Ishitobi, Tokyo (JP)

(73) Assignee: Kobe Steel, Ltd., Kobe-shi (JP)

( * ) Notice: Subject to any disclaimer, the term of this patent is extended or adjusted under 35 U.S.C. 154(b) by 198 days.

(21) Appl. No.: 12/162,367

(22) PCT Filed: Mar. 13, 2007

(86) PCT No.: PCT/JP2007/054992

§ 371 (c)(1),
(2), (4) Date: Jul. 28, 2008

(87) PCT Pub. No.: WO2007/105735

PCT Pub. Date: Sep. 20, 2007

(65) Prior Publication Data

US 2009/0195031 A1    Aug. 6, 2009

(30) Foreign Application Priority Data

Mar. 15, 2006    (JP)    ............... 2006-070530

(51) Int. Cl.
*B62D 25/10*    (2006.01)
(52) U.S. Cl. ............... 296/193.11; 296/187.04; 180/69.2
(58) Field of Classification Search ............ 296/187.04, 296/193.11; 180/69.2, 69.21, 271, 274; 280/762
See application file for complete search history.

(56) References Cited

U.S. PATENT DOCUMENTS

| | | | | |
|---|---|---|---|---|
| 5,000,997 A * | 3/1991 | Ritchie et al. | ................. | 428/78 |
| 6,846,038 B1 * | 1/2005 | White et al. | ............ | 296/193.11 |
| 7,055,894 B2 * | 6/2006 | Ikeda et al. | ............. | 296/187.09 |
| 7,090,289 B2 * | 8/2006 | Koura | ................... | 296/193.11 |
| 7,140,673 B2 * | 11/2006 | Ito et al. | ................. | 296/193.11 |
| 7,147,273 B2 * | 12/2006 | Ikeda et al. | ............ | 296/193.11 |
| 7,150,496 B2 * | 12/2006 | Fujimoto | ............... | 296/187.04 |
| 7,354,101 B2 * | 4/2008 | Donabedian et al. | ... | 296/193.11 |
| 7,377,580 B1 * | 5/2008 | Ekladyous | ............. | 296/193.11 |
| 7,481,488 B2 * | 1/2009 | Ikeda et al. | ............ | 296/193.11 |
| 7,497,507 B2 * | 3/2009 | Matsushima et al. | ... | 296/193.11 |
| 7,578,548 B2 * | 8/2009 | Behr et al. | ............. | 296/193.11 |
| 2004/0182616 A1 * | 9/2004 | Mason | .................... | 180/69.21 |

(Continued)

FOREIGN PATENT DOCUMENTS

JP    2000 168622    6/2000

(Continued)

*Primary Examiner*—Glenn Dayoan
*Assistant Examiner*—Gregory Blankenship
(74) *Attorney, Agent, or Firm*—Oblon, Spivak, McClelland, Maier & Neustadt, L.L.P.

(57) ABSTRACT

An automobile hood includes an outer panel and an inner panel. The inner panel includes a frame-shaped first inner member that joins with the outer panel and a second inner member disposed within the frame of the first inner member. The first inner member includes an outer edge portion, a first inner concave portion that forms an airspace portion, and an inner edge portion. The second inner member includes a second inner concave portion that has joint portions that join with the first inner member and form the airspace portions, panel joint portions that join with the outer panel at position on a center side of the panel, and an extension portion that extends into the first inner concave portion to join with the outer panel.

6 Claims, 17 Drawing Sheets

U.S. PATENT DOCUMENTS

| | | | |
|---|---|---|---|
| 2005/0082874 A1* | 4/2005 | Ikeda et al. | 296/193.11 |
| 2006/0158007 A1* | 7/2006 | Seksaria et al. | 296/193.11 |
| 2006/0220418 A1* | 10/2006 | Behr et al. | 296/187.04 |
| 2008/0007094 A1 | 1/2008 | Ishitobi | |
| 2008/0122261 A1* | 5/2008 | Seo | 296/193.11 |
| 2009/0195031 A1* | 8/2009 | Ishitobi | 296/193.11 |
| 2010/0019540 A1* | 1/2010 | Fujimoto | 296/193.11 |

FOREIGN PATENT DOCUMENTS

| | | |
|---|---|---|
| JP | 2005 28904 | 3/2005 |

* cited by examiner

BUILT-IN PARTS
(THICKNESS OF SECOND INNER MEMBER 3B IS INCREASED
SECTIONAL SHAPE OF SECOND INNER CONCAVE
PORTION 7 IS MODERATED)

AUTOMOBILE HOOD

TECHNICAL FIELD

The present invention relates to an automobile hood.

BACKGROUND ART

In recent years, protection of pedestrians during car accidents has been regulated and a pedestrian protection performance is attracting attention as an index for rating automobile hoods. Meanwhile, a space under the hood necessary for protecting pedestrians has been reduced due to an engine enlarged in an endeavor of obtaining a high engine output and to a number of parts within an engine room increased for a purpose of multiplying functions. Due to that, it has become important to develop an automobile hood that can absorb impact energy efficiently with a small space to attain both a sporty design and the pedestrian protection performance.

As the automobile hood as described above, JPA2000-168622 (Claim 1, FIGS. 1 through 6) describes an automobile hood having a cross-sectional hood structure interposing airspaces between an outer panel and an inner panel when the both panels are joined. JPA2000-168622 also describes the hood structure in which a plurality of dimples having different depths is formed on the inner panel to create the airspaces described above.

FIGS. 13, 16 and 17 show exemplary automobile hoods having hood structures similar to the hood structure described in JPA2000-168622.

As shown in FIGS. 13(a) through 13(c), the automobile hood (beam type hood structure) 21A is constructed by an outer panel 22 having a predetermined curvature and an inner panel 23 having a concave portion 25 at a peripheral part thereof, a plurality of beams 26 extending so as to appropriately intersect or to run substantially in parallel with each other in vertical, horizontal and oblique directions in a panel plane direction at a center part thereof and voids 26A trimmed among the beams 26. Thus, the automobile hood 21A has a cross-sectional structure in which airspace portions 24 are interposed when the peripheral part of the outer panel 22 is joined with an end of the concave portion 25 of the inner panel 23 by means of a hemming process. Further, bonding portions 27 are disposed at predetermined intervals on tops of side walls of the beams 26 to bond the beams 26 with a back face of the outer panel 22 through the intermediary of the bonding portions 27. Still more, a lock reinforcement 30 and hinge reinforcements 31 are joined to the concave portion 25 as reinforcing members of the automobile hood 21A.

As shown in FIGS. 16(a) through 16(c), an automobile hood (cone-type hood structure) 21B is constructed by an outer panel 22 having a predetermined curvature and an inner panel 23 having a concave portion 25 at a peripheral part thereof and a plurality of cone-like convex portions 28 regularly disposed at a center part of the automobile hood 21B. The automobile hood 21B has a cross-sectional structure in which airspace portions 24 are interposed when the peripheral part of the outer panel 22 is joined with an end of the concave portion 25 of the inner panel 23 by means of a hemming process. Further, bonding portions 27 are disposed on tops of the convex portions 28 to bond the convex portions 28 with a back face of the outer panel 22 through the intermediary of the bonding portions 27. Still more, a lock reinforcement 30 and hinge reinforcements 31 are joined to the concave portion 25 as reinforcing members of the automobile hood 21B.

As shown in FIGS. 17(a) through 17(c), an automobile hood (wavy bead-type hood structure) 21C is constructed by an outer panel 22 having a predetermined curvature and an inner panel 23 having a concave portion 25 at a peripheral part thereof and a plurality of wavy beads 29 disposed in parallel in a longitudinal direction of the vehicle at the center part of the automobile hood 21C. The automobile hood 21C has a cross-sectional structure in which the outer panel 22 is joined with the inner panel 23 while interposing airspace portions 24 by joining the peripheral part of the outer panel 22 with an end of the concave portion 25 of the inner panel 23 by means of a hemming process. Further, bonding portions 27 are disposed on tops of the wavy beads 29 at predetermined intervals to bond the wavy beads 29 with a back face of the outer panel 22 through the intermediary of the bonding portions 27. A lock reinforcement 30 and hinge reinforcements 31 are also joined to the concave portion 25 as reinforcing members of the automobile hood 21C.

The pedestrian protection performance of the automobile hood is evaluated by a head injury value (abbreviated as an HIC value hereinafter)) in general. The HIC value is given by the following equation (1) (a maximum value of a product of 2.5 power of average acceleration within an arbitrary time and occurrence time). The smaller the value of HIC, the better the pedestrian protection performance is.

[Equation 1]

$$HIC = (t2 - t1)\left[1/(t2 - t1)\int_{t1}^{t2} a\, dt\right]_{max}^{2.5} \quad (1)$$

Where, "a" is a triaxial combined acceleration (unit is G) at a center of gravity of a head, t1 and t2 are times when the value of HIC is maximized at time t when 0<t1<t2 and a calculated time (t2−t1) is determined to be 15 msec., or less.

FIG. 14(a) is a diagrammatic view explaining a state when a head collides against the prior art automobile hood (the beam-type hood structure 21A, see FIGS. 13(a) through 13(c)), FIG. 14(b) is a graph explaining a relationship between acceleration a and time t when the head collides against the automobile hood and FIG. 14(c) is a graph explaining a relationship between the acceleration a and a stroke (a displacement of the head thrust into an engine room when the head collides against the automobile hood) S. The acceleration generated when the head of the pedestrian collides against the automobile hood may be roughly categorized into primary impact acceleration caused when the head collides against the automobile hood and secondary impact acceleration caused when the automobile hood 21A butts against built-in parts within the engine room. Noted that even though a relationship of degrees between the primary impact acceleration and secondary impact acceleration varies more or less also in the automobile hood (cone-type hood structure) 21B in FIGS. 16(a) through 16(c) and the automobile hood (wavy bead-type hood structure) 21C in FIGS. 17(a) through 17(c), they present the relationship between the acceleration a and the time t and the relationship between the acceleration a and the stroke S similar to those shown in FIGS. 14(b) and 14(c).

Meanwhile, the automobile hood must meet requirements of basic performances required since the past such as a tensile rigidity, a dent resistance, a bending stiffness, a torsional stiffness and the like. The tensile rigidity is necessary to suppress elastic deformation of the automobile hood that is otherwise caused when wax is applied to the hood or when the hood is pressed down to lock. The tensile rigidity is determined by Young's modulus and thickness of the outer panel as well as by position where the outer panel is joined with the inner panel (bonding positions of the bonding portions 27 in FIGS. 13, 16 and 17). The dent resistance is necessary to suppress plastic deformation of the hood that is otherwise caused by and remains due to a fly rock and the like and is affected by proof strength and the thickness of the outer panel. The bending stiffness is necessary to suppress elastic deformation of the peripheral part of the automobile hood that is otherwise caused by lead-in force in locking the automobile hood and by reaction force of a cushion rubber, a damper stay, a sealing rubber and the like and is affected by shapes (secondary moment in area) of the inner panel and reinforcements at the peripheral parts of the automobile hood and the Young's modulus. The torsional stiffness is affected by the bending stiffness of the peripheral part of the automobile hood and the thickness and the shape of the inner panel at the center part.

Although the automobile hood is required to meet both of those basic performances and the pedestrian protection performance, it is often difficult to meet the pedestrian protection performance by a hood whose material, thickness and shape are designed so as to meet only the basic performances because the space under the automobile hood, i.e., the space between the automobile hood and structures such as the engine, is limited.

Then, when the space under the automobile hood is small in the cases of the prior art automobile hoods 21A, 21B and 21C described above, the acceleration generated at the secondary impact is greater and its duration is longer than the acceleration generated at the primary impact as shown in FIGS. 14(b) and 14(c), so that the acceleration of the secondary impact negatively affects the HIC value calculated by the Equation (1) described above (the HIC value does not reach a satisfactory level). Still more, the concave portion 25 is hardly crushed and deformed because the peripheral part of the automobile hoods 21A, 21B and 21C where the bending stiffness is required in particular must have the increased second moment of area of the concave portion 25 of the inner panel 23 and the reinforcements 30 and 31 and must assure the tensile rigidity. Therefore, there has been a problem that it is difficult to reduce the acceleration caused at the time of the secondary impact and to improve the pedestrian protection performance.

One measure for solving this problem by a hood structure of the automobile hood is to decrease the acceleration caused by the secondary impact by fully assuring an energy absorption amount at the time of the primary impact. Although it is conceivable to increase thickness of the panel as a method for realizing this measure, there have been problems that cracks may occur at a hem portion 22A in processing the hem and R of the hem portion 22A increases, thus harming its look, as shown in FIG. 15(a) when the thickness of the outer panel 22 is increased.

When thickness of the peripheral part (the concave portion 25) of the inner panel 23 is increased as shown in FIG. 15(b) on the other hand, the secondary impact G with the built-in parts, i.e., the structures such as the engine, increases and the HIC value aggravates as a result in contrary because a crush-deformation load increases. Specifically, because the concave portion 25 of the peripheral part is required to have a high bending stiffness, a sectional height "h" of the concave portion 25 cannot be reduced even when the thickness thereof is increased. Therefore, there has been a problem that although an energy absorption amount at the time of the primary impact increases, a rise in the acceleration at the time of the secondary impact becomes sharp and the stroke decreases as shown in FIGS. 15(c) and 15(d), thus leading to the aggravation of the HIC value. It is noted that in FIGS. 15(c) and 15(d), broken lines represent the case when the automobile hood using the inner panel in which the thickness of the peripheral part (the concave portion 25) is not increased is used.

Another measure for improving the pedestrian protection performance is to hold or to increase the energy absorption amount at the time of the primary impact and at the same time, to lower the crush-deformation load of the hood to reduce the acceleration at the time of the secondary impact. In order to realize this measure, it is conceivable to form the peripheral part (the concave portion 25) of the inner panel 23 into a readily crushable shape or more specifically, to relax the shape of the concave portion 25 of the inner panel 23 (to moderate inclination angles θ1 and θ2 of the side walls of the concave portion 25). However, this method also has had a problem that the tensile rigidity of the outer panel 22 becomes insufficient because a distance L for joining (bonding) the outer panel 22 with the inner panel 23 extends and an elastic deformation volume D of the outer panel 22 increases because a cross-section of the concave portion 25 cannot be reduced to ensure the bending stiffness of the automobile hood.

In view of the problems described above, the present invention seeks to provide an automobile hood that meets the basic performances required to the automobile hood and to the peripheral part of the automobile hood in particular and that excels in the pedestrian protection performance.

DISCLOSURE OF THE INVENTION

In order to solve the aforementioned problems, according to the invention of Claim 1, there is provided an automobile hood constructed by joining a peripheral part of an outer panel with a peripheral part of an inner panel and having a cross-sectional structure in which airspace portions are interposed at predetermined positions between the both panels when the peripheral parts of the both panels are joined, wherein the inner panel includes a frame-shaped first inner member joined with the peripheral part of the outer panel and has a concave sectional shape and a second inner member disposed within the frame of the first inner member, joined with the first inner member on one side and joined with the outer panel on the other side; the first inner member includes an outer edge portion that joins with the peripheral part of the outer panel, a first inner concave portion formed continuously from the outer edge portion and forms the airspace portion between the outer panel and the first inner concave portion and an inner edge portion formed continuously from the first inner concave portion and is joined with the second inner member; and the second inner member has second inner concave portions that have joint portions that join with the inner edge portion of the first inner member and form the airspace portions between the outer panel and the second inner concave portions, panel joint portions that join with the outer panel at position on a side closer to a center of the panel than the joint portion and an extension portion that is formed continuously from the joint portion and extends into the first inner concave portion to join with the outer panel.

By constructing as described above, bending stiffness may be assured by equalizing a second moment of area (size of a cross-section) of the first inner concave portion of the inner panel (first inner member) with the prior art automobile hood. At this time, the first inner concave portion may be formed into a moderate shape. Therefore, an energy absorption amount in a primary impact increases, a crush-deformation load of the hood is reduced and a stroke is assured when a head collides against the hood, so that secondary impact acceleration is reduced. Still more, because the extension portion of the second inner member extending into the first inner concave portion is joined with the outer panel, intervals for joining (bonding) the outer panel with the inner panel (second inner member) is not widened and hence tensile rigidity of the outer panel may be assured.

According to the invention of Claim 2, there is provided an automobile hood constructed by joining a peripheral part of an outer panel with a peripheral part of an inner panel and having a cross-sectional structure in which airspace portions are interposed at predetermined positions between the both panels when the peripheral parts of the both panels are joined; wherein the inner panel includes a first inner member joined with a part of the peripheral part of the outer panel and has a concave sectional shape and a second inner member disposed on the side closer to the center of the panel than the first inner member and is joined with the first inner member and the outer panel; the first inner member includes an outer edge portion joined with the peripheral part of the outer panel, a first inner concave portion formed continuously from the outer edge portion and that forms the airspace portions between the outer panel and the first inner concave portion and an inner edge portion formed continuously from the first inner concave portion and joined with the second inner member; and the second inner member has second inner concave portions that have joint portions that join with the inner edge portion of the first inner member and forms the airspace portions between said outer panel, an edge portion formed continuously from the second inner concave portion and joined with other remaining peripheral parts of the outer panel, panel joint portions that join with the outer panel at positions on a side closer to a center of the panel than the joint portion and an extension portion that is formed continuously from the joint portion and extends into the first inner concave portion to join with the outer panel.

By constructing as described above, it is not necessary to form the first inner member into the shape of a frame in fabricating the inner panel, so that an amount of member to be used may be reduced and may be lightened, in addition to the actions obtained by Claim 1.

According to the invention of Claim 3, the automobile hood is constructed such that the extension portion of the second inner member extends from the joint portion with a predetermined width.

An area of the extension portion of the second inner member becomes small and the second inner member may be lightened by constructing as described above.

According to the invention of Claim 4, the automobile hood is constructed such that the second inner member is continuously formed from the extension portion by raising at a predetermined angle to have a flange portion that extends to the peripheral part side of the outer panel.

The energy absorption amount increases further at the time of the primary impact and the secondary impact acceleration is reduced further when the head collides against the hood by constructing the hood as described above.

BEST MODE FOR CARRYING OUT THE INVENTION

First Embodiment

A first embodiment of an automobile hood of the invention will be explained in detail below with reference to the drawings. It is noted that outer and inner panels (first and second inner members) are represented by lines and thickness thereof is not shown in parts of the drawings.

Figure 1A:
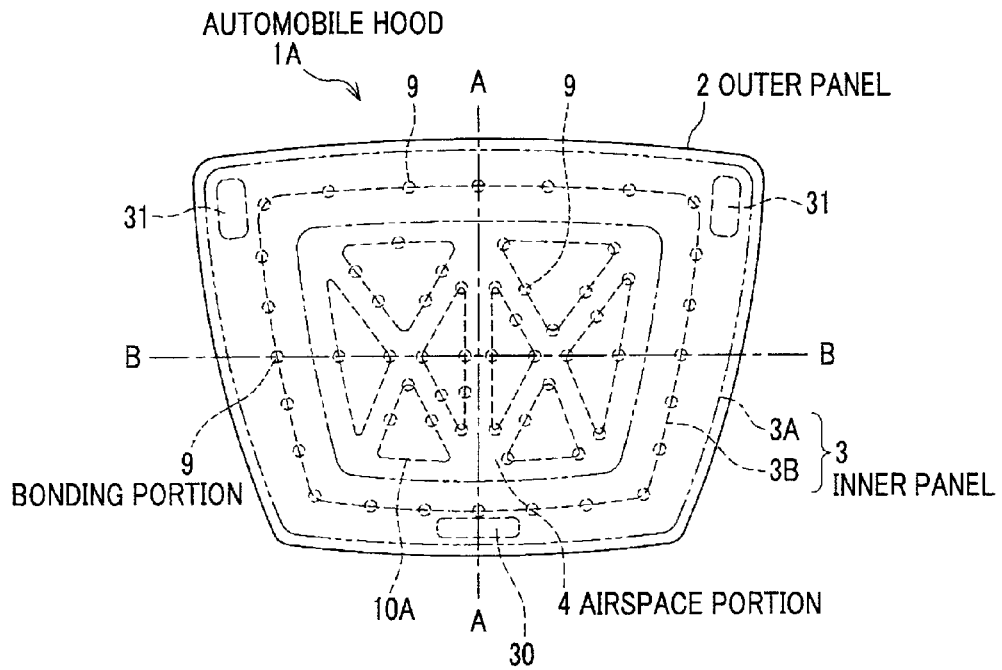
FIG. 1(a) is a plan view showing a configuration of an automobile hood.
Figure 1B:
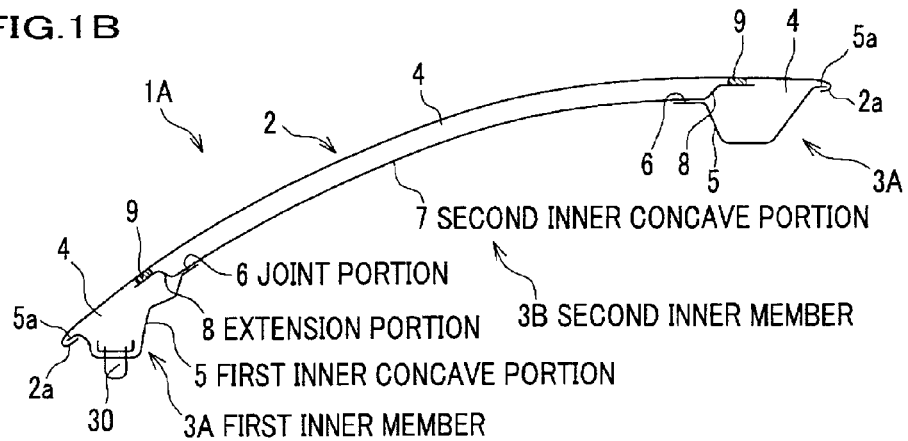
FIG. 1(b) is an end elevational view taken along a line A-A in FIG. 1(a) and FIG. 1(c) is an end elevational view taken along a line B-B in FIG. 1(a).
Figure 1C:
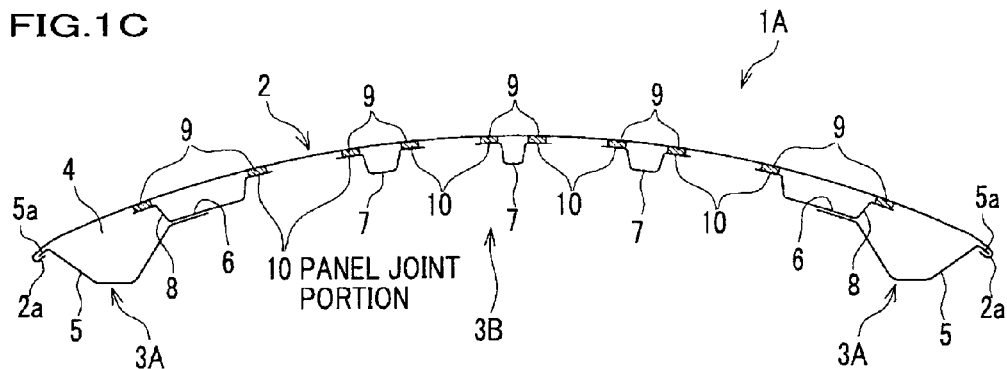
Figure 2:
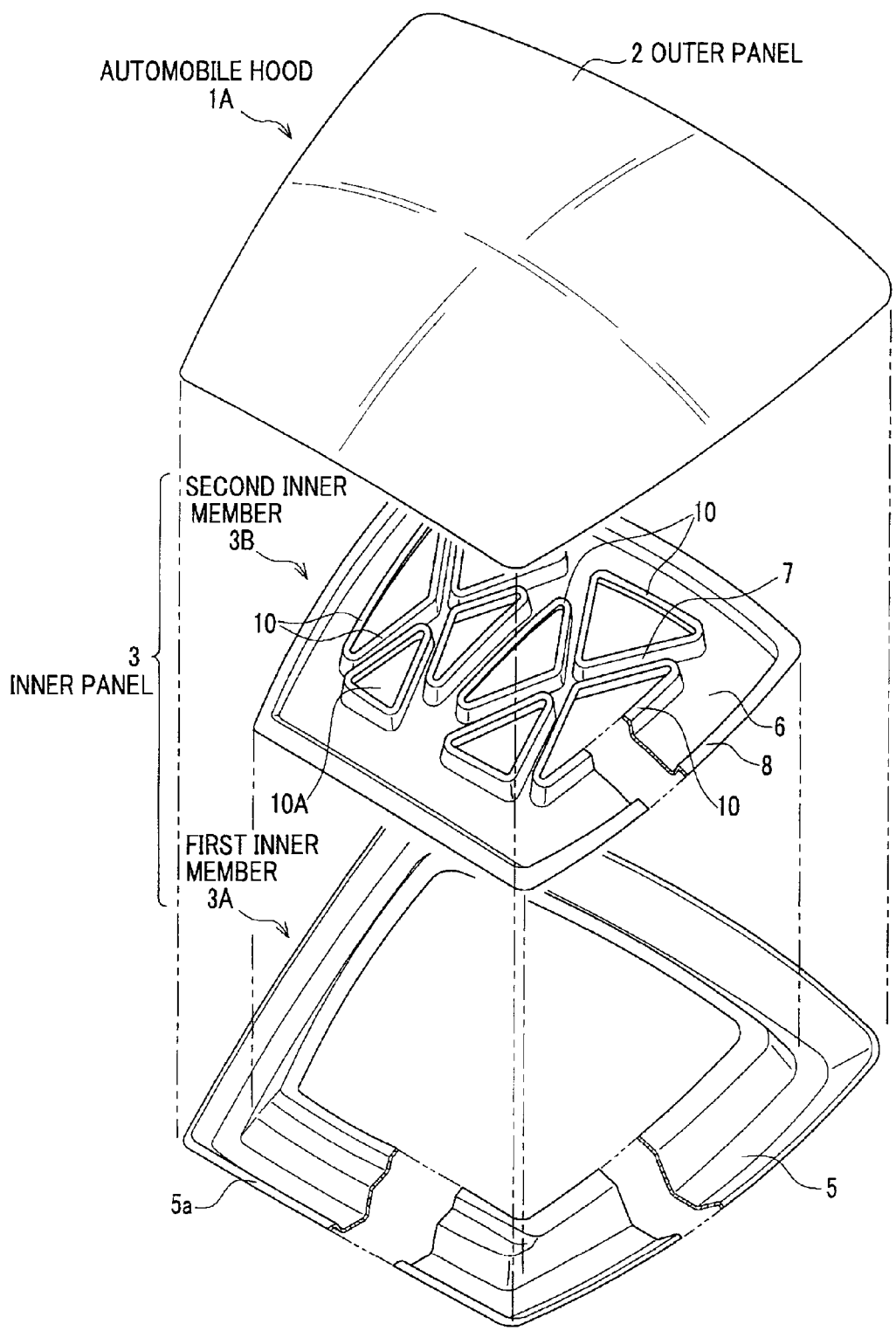
FIG. 2 is an exploded perspective view of the automobile hood in FIG. 1.

As shown in FIGS. 1 and 2, an automobile hood 1A of the invention is constructed by joining the outer panel 2 with the inner panel 3 and has a cross-sectional structure in which airspace portions 4 are interposed at predetermined positions between the both panels 2 and 3 when the both panels 2 and 3 are joined.

<Outer Panel>

The outer panel 2 is constructed by a light-weighted and high tensile strength metallic plate having a predetermined curvature. Preferably, the metal is steel or an aluminum alloy of 3000, 5000, 6000 or 7000 series. The outer panel 2 is preferred to be 1.1 mm or less in thickness in the case of a steel plate or 1.5 mm or less in thickness in the case of the aluminum alloy for example. Note that the outer panel 2 may be constructed by a plate member made of resin or carbon fiber.

The outer panel 2 is joined with a peripheral part of the inner panel 3 described later at a peripheral part thereof by means of fitting such as hem processing, bonding, brazing or the like and has the cross-sectional structure interposing the airspace portions 4 between the outer panel 2 and the inner panel 3.

<Inner Panel>

The inner panel 3 includes a frame-shaped first inner member 3A that has a concave cross-sectional shape and that joins with the peripheral part of the outer panel 2 and a second inner member 3B that is disposed within the frame of the first inner member 3A, joins with the first inner member 3A on one side and joins with the outer panel 2 on the other side. The first and second inner members 3A and 3B are made of the light-weight and high tensile strength metallic plate and preferably, the metal is steel or an aluminum alloy of 3000, 5000, 6000 or 7000 series.

(First Inner Member)

Figure 3A:
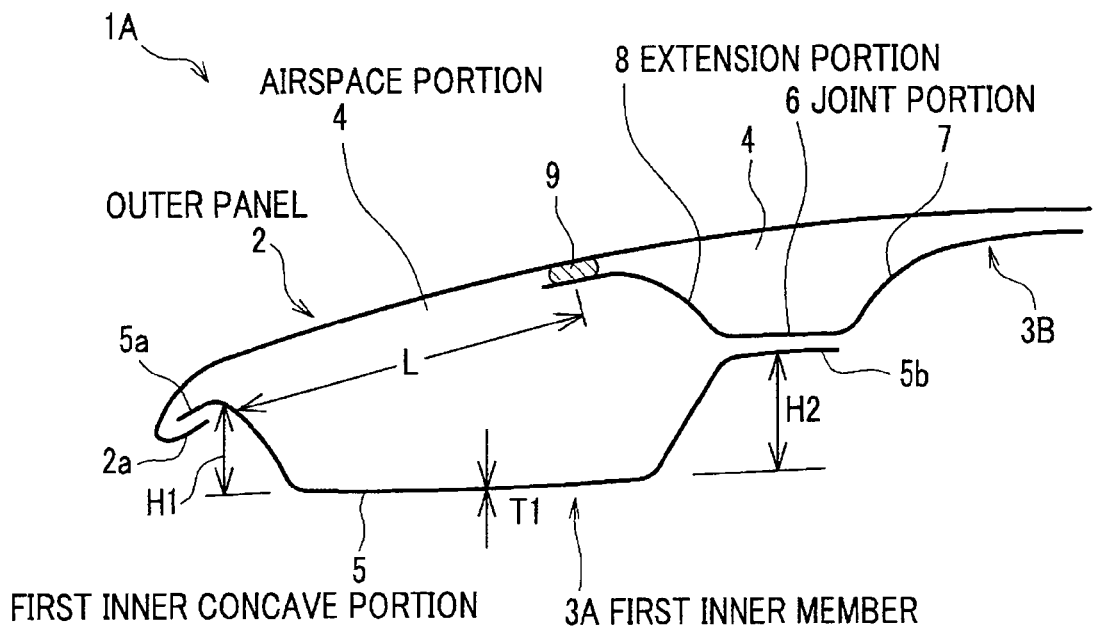
FIG. 3(a) is an enlarged end elevational view of a first inner concave portion in FIG. 1

As shown in FIGS. 1 and 3(*a*), the first inner member 3A includes an outer edge portion 5*a* that joins with a peripheral portion 2*a* of the outer panel 2, a first inner concave portion 5 that is formed continuously from the outer edge portion 5*a* and forms the airspace portion 4 between the outer panel 2 and an inner edge portion 5*b* that is formed continuously from the first inner concave portion 5 and that joins with the second inner member 3B described later. Although it is preferable to mechanically join the peripheral portion 2*a* with the outer edge portion 5*a*, e.g., by means of the hem processing, here, they may be joined by welding or bonding by means of a resin layer or the like. Although it is also preferable to join the inner edge portion 5*b* with the second inner member 3B (joining portion 6) by means of welding, they may be mechanically joined or bonded by means of a resin layer or the like.

As shown in FIG. 3(*a*), a thickness T1 of the first inner member 3A is selected depending on the bending stiffness of the outer panel 2 determined by a type of a vehicle for which the automobile hood 1A is used in particular and its preferable adequate value is in a range from 0.7 to 1.5 mm in the case of the aluminum alloy and in a range from 0.5 to 1.1 mm in the case of the steel plate. When the thickness is less than the under limit value, the bending stiffness of the automobile hood tends to be insufficient and when the thickness T1 exceeds the upper limit value, the pedestrian protection performance tends to drop because the crush-deformation load increases. Note that although it is possible to assure the bending stiffness only by the first inner member 3A and to eliminate the lock reinforcement 30 (see FIGS. 1(*a*) and 1(*b*)), it is preferable to increase the thickness T1 at this time more than that described above to a range from 1.5 to 3.5 mm in the case of the aluminum alloy and to a range from 1.1 to 2.5 mm in the case of the steel plate.

The shape of the first inner concave portion 5 of the first inner member 3A affects the rigidity of the automobile hood 1A and the pedestrian protection performance and adequate values of cross-sectional heights H1 and H2 that determine the shape of the first inner concave portion 5 are preferable to be 5 mm<H1<60 mm, 10 mm<H2<80 mm and 20 mm<H1+H2<120 mm. When the cross-sectional heights H1 and H2 are equal to or less than the lower limit value, the bending stiffness of the automobile hood 1A tends to be insufficient and when the cross-sectional heights H1 and H2 are equal to or more than the upper limit value, the secondary impact acceleration tends to increase and the HIC value tends to increase (the pedestrian protection performance tends to drop) because a timing when the first inner member 3A butts against the built-in parts, i.e., the structures such as the engine, is quickened. It is also possible to form the first inner concave portion 5 into a shape in which the height of the concave portion is small and an inclination angle of a slope (sidewall) is small, i.e., into a moderate shape, by providing an extension portion 8 from the second inner member 3B to join with the outer panel 2 even if the first inner concave portion 5 has the equal second moment of area.

Figure 4A:
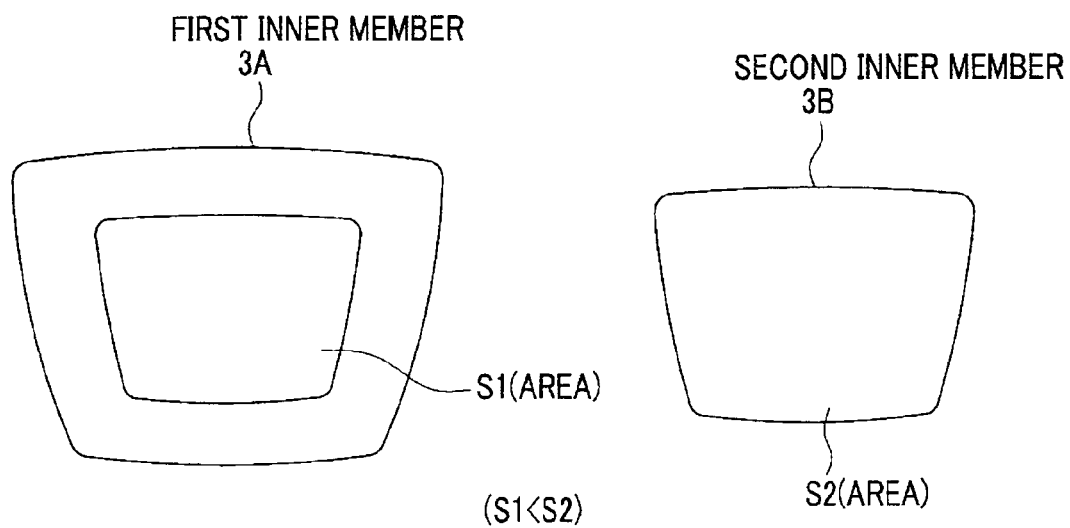
FIG. 4(a) shows diagrammatic plan views of a first inner member and a second inner member and FIG. 4(b) is a diagrammatic plan view of another first inner member.
Figure 4B:
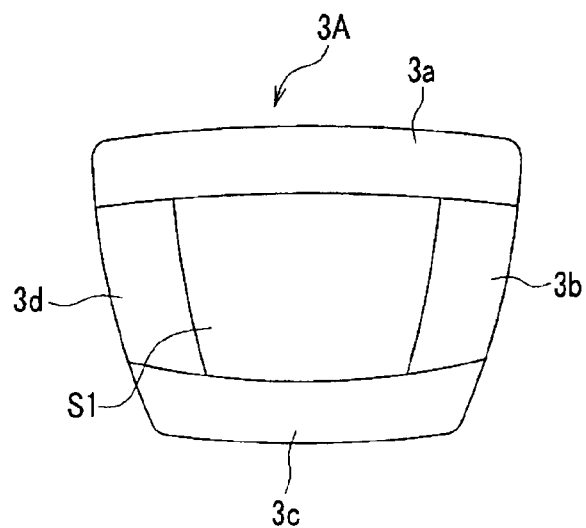

The first inner member 3A is constructed by a frame-shaped plate having a hollow space at a center part of the plate as shown in FIG. 4*a*. An area S1 of the hollow space is formed to be smaller than an area S2 of the second inner member 3B. As a result, a member at the hollow space cannot be used as the second inner member 3B and is wasteful. In order to solve such problem, it is preferable to use a tailored blank member formed by joining four members 3*a*, 3*b*, 3*c* and 3*d* by means of welding or the like as the first inner member 3A. It becomes possible to cut a manufacturing cost because no wasteful member at the hollow space is generated by using the tailored blank material.

(Second Inner Member)

As shown in FIGS. 1, 3(*a*), 3(*b*) and 5(*a*), the second inner member 3B has the joint portion 6 that joins with the inner edge portion 5*b* of the first inner member 3A by means of welding or the like and includes a second inner concave portion 7 that forms the airspace portion 4 between the outer panel 2, panel joint portions 10 that join with the outer panel 2 at positions on the center side of the panel more than the joint portion 6 and the extension portion 8 that is formed continuously from the joint portion 6 so as to extend into the first inner concave portion 5 and is joined with the outer panel 2.

The second inner concave portion 7 is formed by concave beams extending appropriately so as to intersect with or to run substantially in parallel in vertical, horizontal and oblique directions on a surface of the second inner member 3B and has trimmed (chamfered) voids 10A formed among the beams. Then, rib portions that form the panel joint portions 10 are formed on end faces of the second inner concave portions 7 (concave beams). The panel joint portions 10 are bonded (joined) with the outer panel 2 via bonding portions 9 composed of a resin layer or the like together with the extension portion 8 described later and form the airspace portions 4 between the outer panel 2 and the second inner member 3B. The method for joining them is not limited to the bonding through the bonding portions 9 but may be joined by means of mechanical joint or welding. Still more, the mode for forming the beams in the second inner member 3B (shape of the voids 10A) is not limited to the formation described in FIG. 1(a) but may be appropriately modified.

Figure 5A:
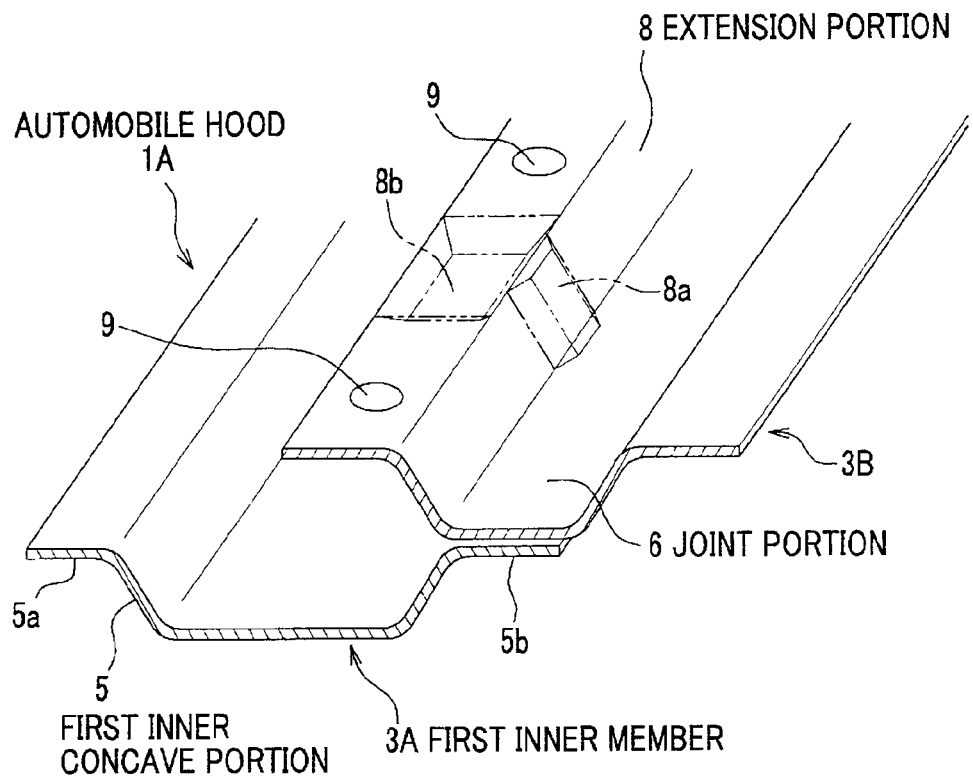
FIG. 5(a) is a partially sectional perspective view along the line B-B in FIG. 1(a) showing a configuration of an extension section and FIG. 5(b) is a graph explaining a relationship between accelerations and strokes when a head collides against the automobile hood in FIG. 1(a).

It becomes possible to enhance the tensile rigidity of the outer panel 2 and to design the first inner concave portion 5 into the moderate shape that has a required bending stiffness and a reduced crush-deformation load and that excels in the pedestrian protection performance by providing the extension portion 8 that is formed continuously from the joint portion 6 to the second inner member 3B and by extending the extension portion 8 into the first inner concave portion 5 to bond (join) with the outer panel 2 via the bonding portion 9. The bonding (joint) position of the extension portion 8, i.e., the distance L (see FIG. 3(a)) thereof from the peripheral portion 2a of the outer panel 2 is selected depending on the tensile rigidity of the outer panel 2 that differs depending on types of a vehicle to which the automobile hood 1A is used and its adequate value is preferably 250 mm or less. Still more, as shown in FIG. 5a, convex bead portions 8a may be provided on an inclined face extending at a predetermined angle into the first inner concave portion 5 at predetermined intervals or concave stepped portions 8b may be provided on a plane bonding with the outer panel 2 between the bonding portions 9. A shape freezing property of the extension portion 8 is enhanced and a deformation load caused when the head collides may be readily controlled by providing such bead portions 8a and stepped portions 8b.

Figure 3B:
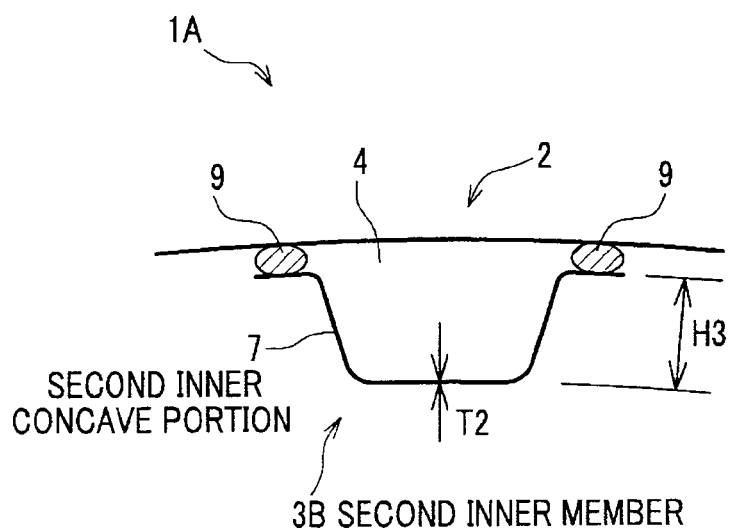
FIG. 3(b) is an enlarged end elevational view of a second inner concave portion in FIG. 1.

As shown in FIG. 3(b), thickness of the second inner member 3B (thickness T2 of the second inner concave portion 7) and a shape (height H3 of the second inner concave portion 7) of the second inner member 3B affect inertia force caused due to a difference of relative speed of the head and the automobile hood when the head collides against the automobile hood. Therefore, it becomes possible to increase the acceleration at the time of the primary impact, to assure full energy absorption amount and to improve the pedestrian protection performance of the automobile hood by appropriately setting the thickness and the shape.

An appropriate value of the thickness T2 of the second inner member 3B (the second inner concave portion 7) is in a range from 0.3 to 2.7 mm in the case when the second inner member 3B is an aluminum alloy plate and is in a range from 0.4 to 1.0 mm in the case when the second inner member 3B is a steel plate. When the thickness T2 is less than the lower limit value, it becomes difficult to press-mold or to roll the second inner member 3B and when the thickness exceeds the upper limit value, the HIC value at the time of primary impact tends to exceed a reference value (HIC value=1000). Note that when the second inner member 3B is fabricated by using a metal other than the aluminum alloy and steel, an upper limit value of the thickness T2 is determined such that it is inversely proportional to a specific gravity of the metal to be used.

An appropriate value of the shape of the second inner member 3B (sectional height H3 of the concave portion of the second inner concave portion 7) is in a range from 3 to 30 mm in the cases when the second inner member 3B is the aluminum alloy plate and the steel plate. When the sectional height H3 is less than the lower limit value, the effect of enhancing the rigidity by the second inner concave portion 7 tends to become small even if the thickness T2 is set at the upper limit value. As a result, only a vicinity of an impact site is deformed when the head collides against the hood and no stress propagates around the impact site, so that a mass of the second inner member 3B hardly acts effectively as inertia force, the energy absorption amount is not fully assured at the time of primary impact and the HIC value tends to aggravate. When the sectional height H3 exceeds the upper limit value, the timing when the second inner member 3B collides against the built-in parts, i.e., the structures such as the engine, is quickened, the secondary impact acceleration increases and the HIC value tends to aggravate, though it depends on a space under the automobile hood.

Although it is possible to prevent the HIC value from aggravating by adjusting the crush-deformation load by the inclination angle of the slope of the second inner concave portion 7 when the both of the thickness T2 and the sectional height H3 of the second inner member 3B are closer to their upper limit values, the joint (bonding) distance L between the outer panel 2 and the inner panel 3 (the second inner member 3B) tends to be widened and it becomes difficult to assure the tensile rigidity of the outer panel 2. Accordingly, when either one of the thickness T and the height H3 has a value closer to the upper limit value, it is preferable to set the other one to a value farther from the upper limit value.

As described above, the automobile hood 1A of the invention has the cross-sectional structure in which the airspace portions 4 are formed from the first inner concave portion 5 (the first inner member 3A) and the second inner concave portion 7 (the second inner member 3B) at the predetermined positions between the both panels 2 and 3 by joining the peripheral portion 2a of the outer panel 2 with the outer edge portion 5a of the inner panel 3 and in which the panel joint portions 10 formed on the end faces of the second inner concave portions 7 are bonded (joined) with the extension portion 8 formed at the peripheral part of the second inner member 3B through the bonding portions 9 (see FIGS. 1(b), 1(c) and 5(a)).

(Mechanism for Improving Pedestrian Protection Performance)

Figure 5B:
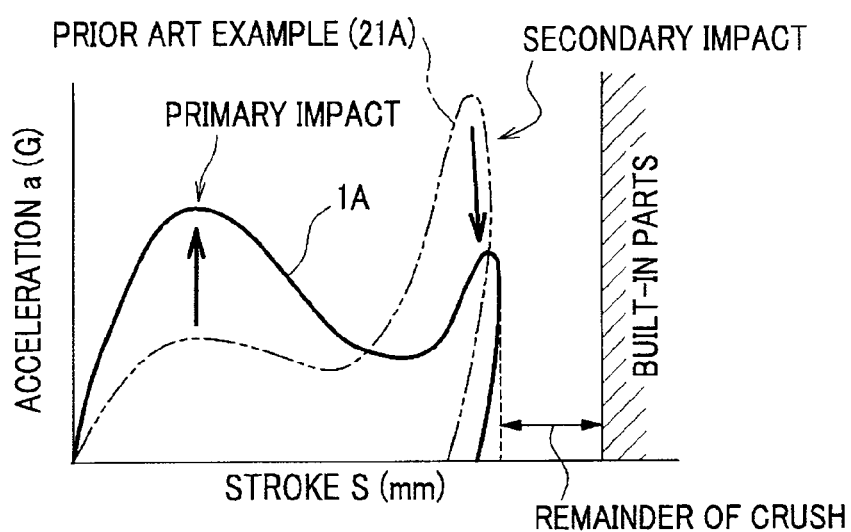

The acceleration generated when the head collides against the hood undergoes a transition as indicated by a solid line in FIG. 5(b) because the automobile hood 1A has the cross-sectional structure as described above. As shown in FIG. 5(b), the acceleration at the time of the primary impact increases and the energy absorption amount at the time of the primary impact increases in the case of the automobile hood 1A as compared to the case of the prior art automobile hood 21A. Still more, the crush-deformation amount of the automobile hood 1A increases and the remainder of crush becomes small, so that the stroke increases. As a result, the acceleration generated at the time of the secondary impact decreases. From such transition of the acceleration, the HIC value that is an index of the pedestrian protection performance calculated by the Equation (1) described above becomes small because average acceleration within an arbitrary time decreases.

Accordingly, it can be seen that the automobile hood 1A improves the pedestrian protection performance.

(Mechanism for Assuring Rigidity)

A sectional area of the automobile hood 1A is assured by the airspace portions 4 formed by the first inner concave portion 5 of the first inner member 3A and the extension portion 8 of the second inner member 3B as shown in FIGS. 1(b) and 1(c), so that the bending stiffness and the torsional stiffness required as a hood may be obtained. In connection with that, the extension portion 8 of the inner panel 3 (the second inner member 3B) joins (bonds) with the outer panel 2 via the bonding portion 9 and the joint (bonding) position is located on the outer peripheral side of the outer panel 2, so that the tensile rigidity and the dent resistance required as a hood may be obtained.

Next, an exemplary modification of the automobile hood 1A of the invention will be explained with reference to the drawings. It is noted that the outer and inner panels (first and second inner members) are represented by lines without showing their thickness in parts of the drawings.

(Exemplary Modification of Extension Portion)

Figure 6A:
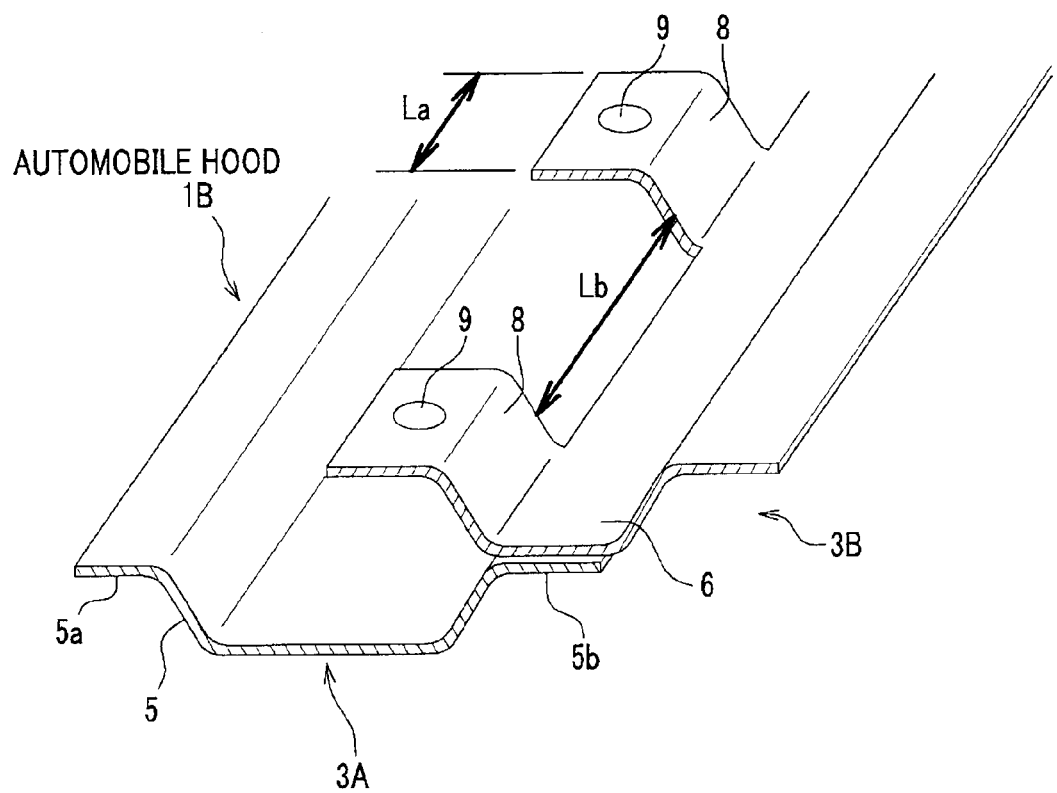
FIG. 6(a) is a partially sectional perspective view showing another configuration of the extension section and FIG. 6(b) is a graph explaining a relationship between accelerations and strokes when the head collides against the automobile hood in FIG. 6(a).
Figure 6B:
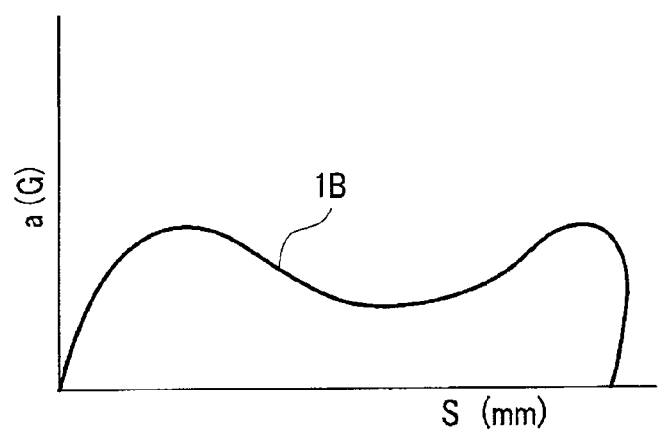

Although the case when the extension portion 8 of the automobile hood 1A is formed continuously around the whole peripheral part of the second inner member 3B (the joint portion 6) has been shown in FIG. 5(a), the invention is not limited to the mode of forming the extension portion around the whole peripheral part and a mode of forming no extension portion at corners of the peripheral part may be adopted for example. When an enough space is assured under the automobile hood for example, the automobile hood may be an automobile hood 1B that includes extension portions 8 extending from the joint portion 6 of the second inner member 3B with a predetermined width (predetermined width La assuring the bonding portion 9, e.g., 15 mm) around the whole peripheral part at predetermined intervals Lb (e.g., 100 to 300 mm) as shown in FIG. 6a. Because the enough space is assured under the hood in the automobile hood 1B, the stroke S at the time when the head collides against the hood is fully assured and the secondary impact acceleration may be kept low as shown in FIG. 6(b). As a result, the HIC value may be also lowered. Still more, the tensile rigidity of the outer panel is also fully assured because the extension portion 8 is joined (bonded) with the outer panel (not shown) via the bonding portion 9.

Figure 7A:
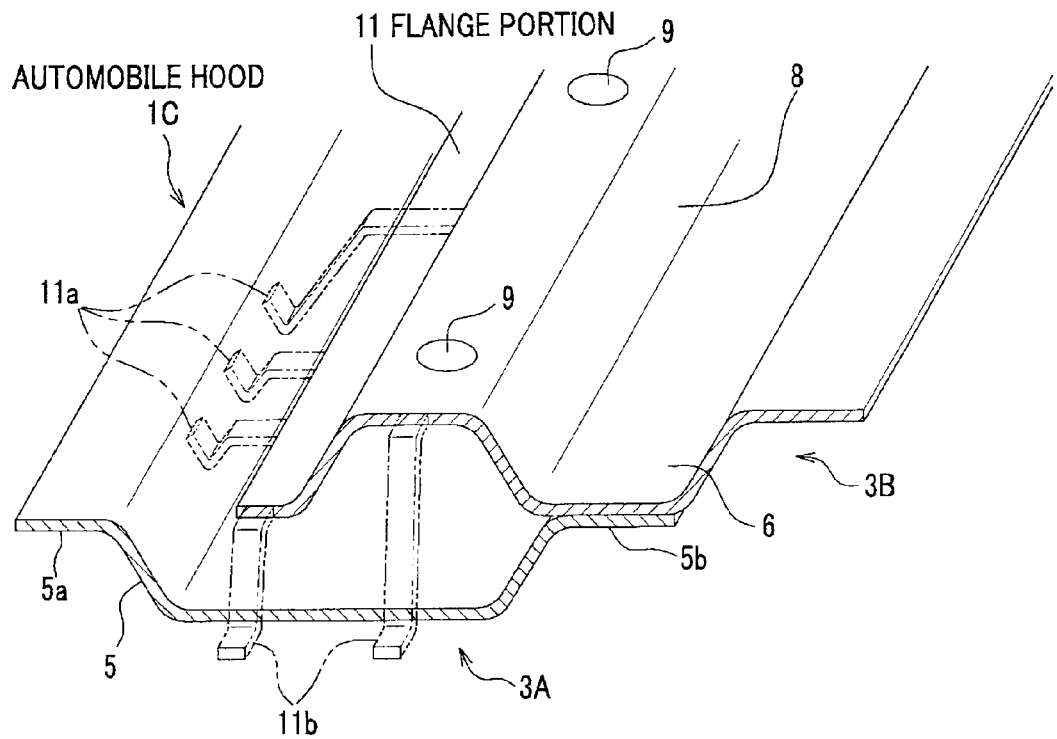
FIG. 7(a) is a partially sectional perspective view showing still another configuration of the extension section.
Figure 7B:
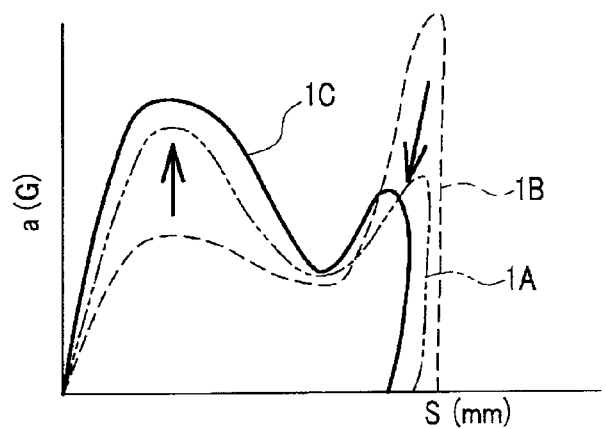
FIG. 7(b) is a graph explaining a relationship between accelerations and strokes when the head collides against the automobile hood in FIG. 7(a) and FIG. 7(c) is a graph explaining a relationship between the accelerations and time when the head collides against the automobile hood.
Figure 7C:
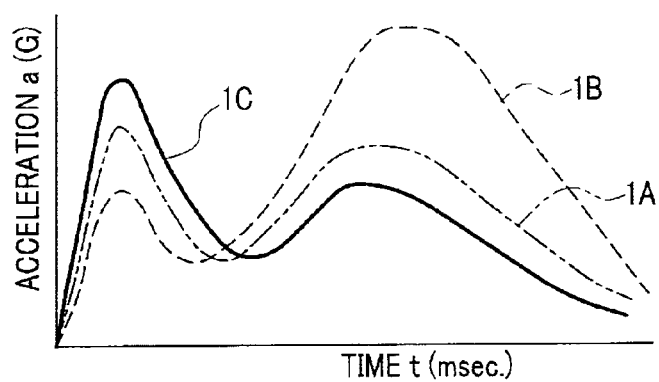

When the space under the automobile hood is small and the secondary acceleration at the time when the head collides against the hood tends to increase in contrary, it is preferable to adopt an automobile hood IC having a flange portion 11 that is formed from the extension portion 8 of the second inner member 3B so as to rise at a predetermined angle and that extends to the peripheral part side of the outer panel (not shown), i.e., to the side of the outer edge 5a of the first inner member 3A that joins with the peripheral part of the outer panel. Preferably, the flange portion 11 is formed into a shape that will not interfere with the first inner member 3A during deformation caused when the head collides against the hood. In the case of the automobile hood IC, the energy absorption amount at the time of the primary impact increases, the secondary impact acceleration is reduced and the HIC value becomes low when the head collides against the hood as shown by solid lines in FIGS. 7(b) and 7(c) as compared to those of the automobile hood 1A having no flange portion. The flange portion 11 or the extension portion 8 may have legs 11a or 11b that extend partially from an end face thereof in a vehicle width direction or in a vehicle longitudinal direction and that join (bond) with the first inner member 3A (the first inner concave portion 5). It becomes possible to firmly assemble the second inner member 3B and to prevent the outer panel from being damaged when the flange portion 11 hits against an inner side of the outer panel (not shown) by having such legs 11a and 11b.

(Exemplary Modification of Thickness of Second Inner Member)

Figure 8A:
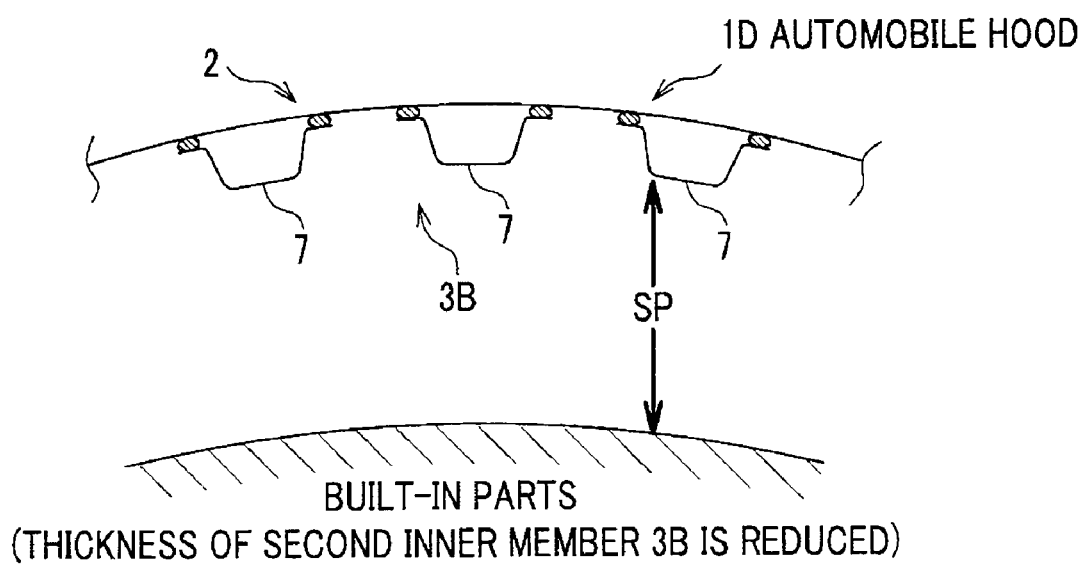
FIG. 8(a) is a partially sectional perspective view showing another configuration of the second inner member and FIG. 8(b) is a graph explaining a relationship between accelerations and strokes when the head collides against the automobile hood in FIG. 8(a).
Figure 8B:
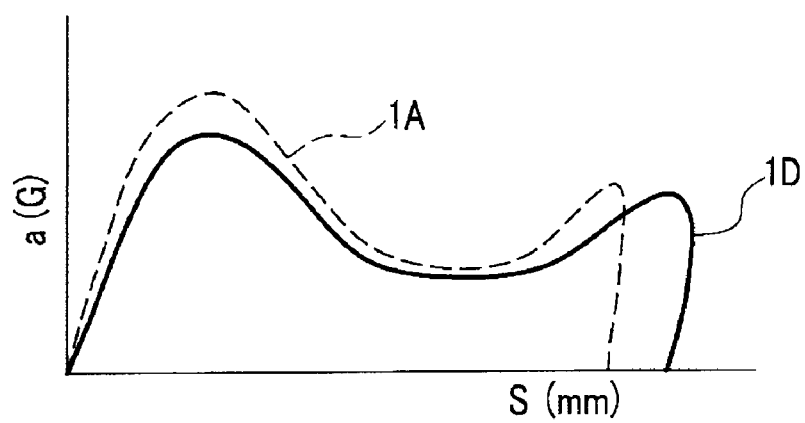

The automobile hood of the invention may be what the thickness T2 of the second inner member 3B (see FIG. 3(b)) is determined corresponding to a required performance of the automobile hood, beside the first inner member. For instance, when a space SP is fully assured under the automobile hood (under the inner panel), it is preferable to adopt an automobile hood 1D in which the thickness of the second inner member 3B (the second inner concave portion 7) is reduced (more than the thickness of the first inner member not shown) as shown in FIG. 8(a). In the case of this automobile hood 1D, a degree of deformation of the hood is large and the stroke increases as compared to the automobile hood 1A described above as indicated by a solid line in FIG. 8(b) because the crush-deformation load of the second inner concave portion 7 is reduced when the head collides against the hood. As a result, the secondary acceleration does not increase and the HIC value does not worsen. In addition to that, the automobile hood 1D may be lightened by reducing the thickness of the plate.

Figure 9A:
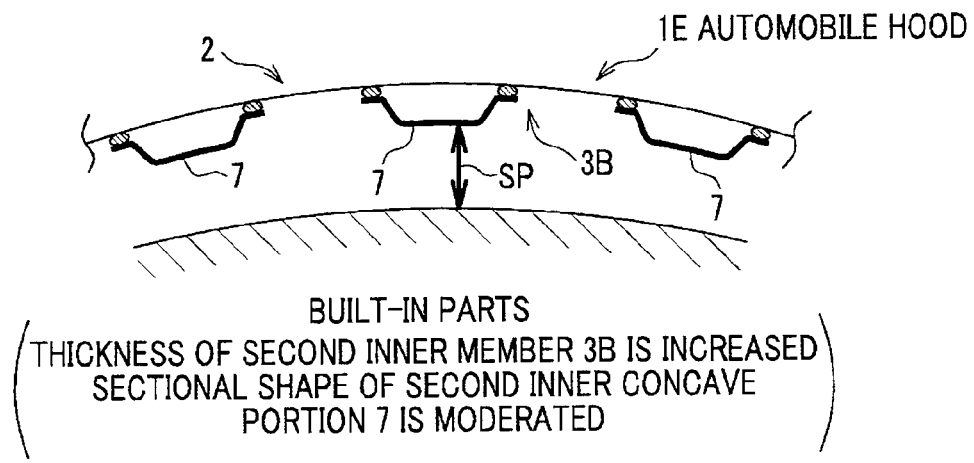
FIG. 9(a) is a partially sectional perspective view showing another configuration of the second inner member.
Figure 9B:
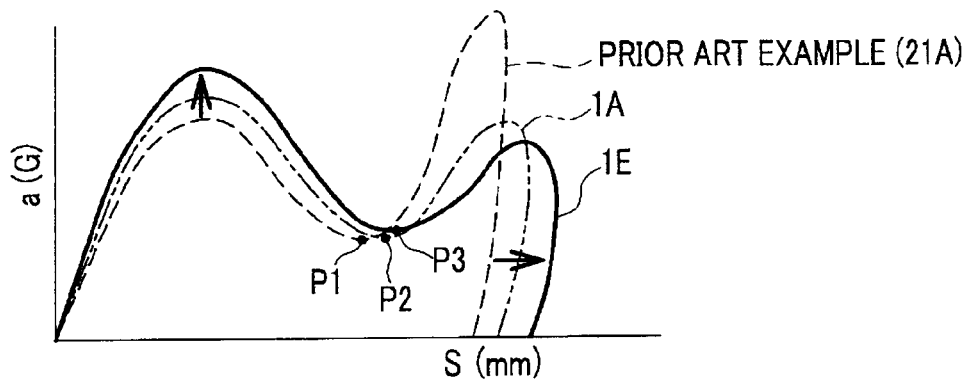
FIG. 9(b) is a graph explaining a relationship between accelerations and strokes when the head collides against the automobile hood in FIG. 7(a) and FIG. 9(c) is a graph explaining a relationship between the accelerations and time when the head collides against the hood.
Figure 9C:
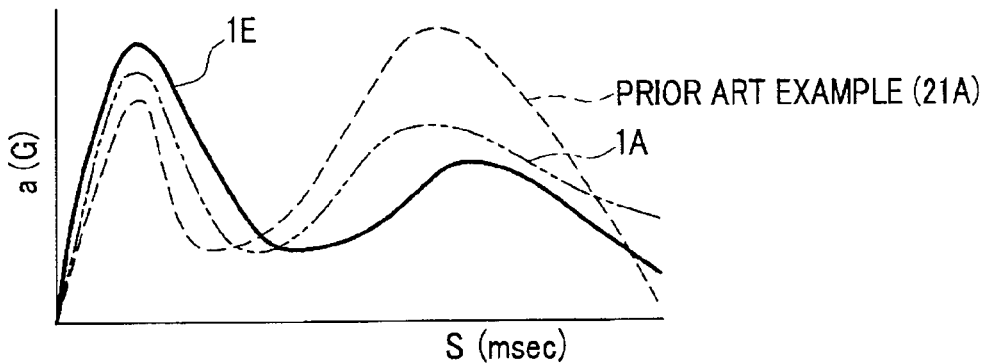

When the space SP under the automobile hood is small as shown in FIG. 9(a) in contrary, it is preferable to adopt an automobile hood 1E in which the thickness of the second inner member 3B (the second inner concave portion 7) is increased (more than the thickness of the first inner member not shown), the height of the second inner concave portion 7 is reduced and the inclination angle of the slope of the concave portion is moderated (the shape is moderated). In the case of the automobile hood 1E, an energy absorption amount at the time of the primary impact increases when the head collides against the hood as compared to the automobile hood 1A and the prior art example 21A described above as indicated by solid lines in FIGS. 9(b) and 9(c). Then, the crush-deformation load is reduced and the timing when the inner panel (the second inner member 3B) collides against the built-in parts becomes late by moderating the shape of the second inner concave portion 7. Then, the stroke increases as a result, so that the secondary acceleration is reduced and the HIC value becomes low.

(Exemplary Modification of Second Inner Concave Portion)

Figure 10A:
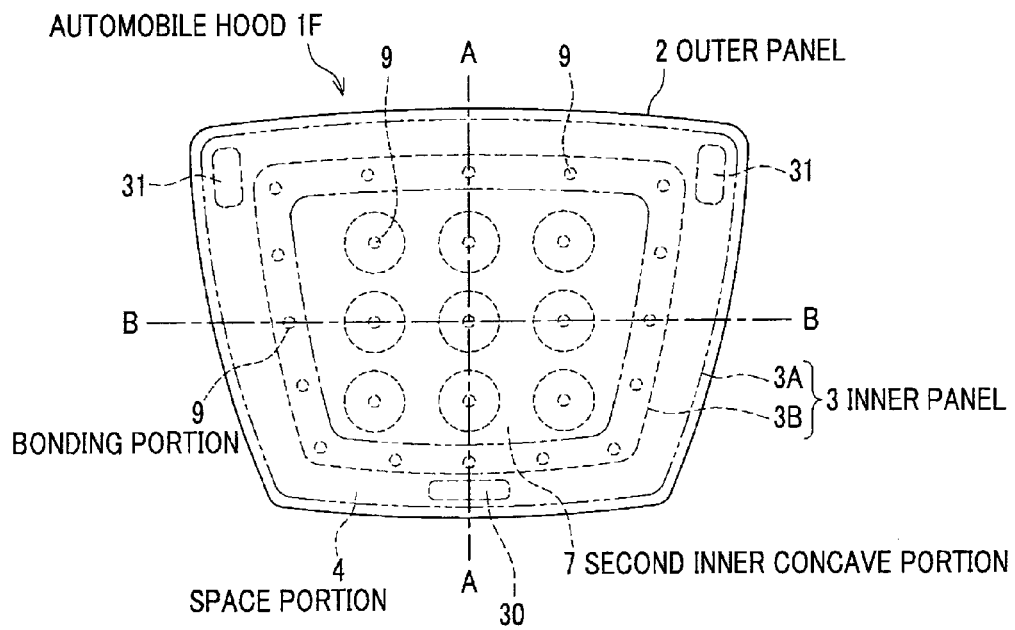
FIG. 10(a) is a plan view showing another configuration of an automobile hood.
Figure 10B:
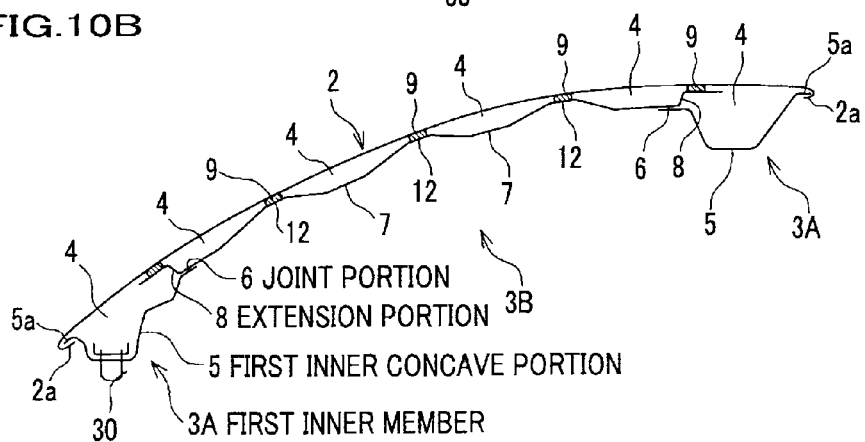
FIG. 10(b) is an end elevational view taken along a line A-A in FIG. 10(a) and FIG. 10(c) is an end elevational view taken along a line B-B in FIG. 10(a).
Figure 10C:
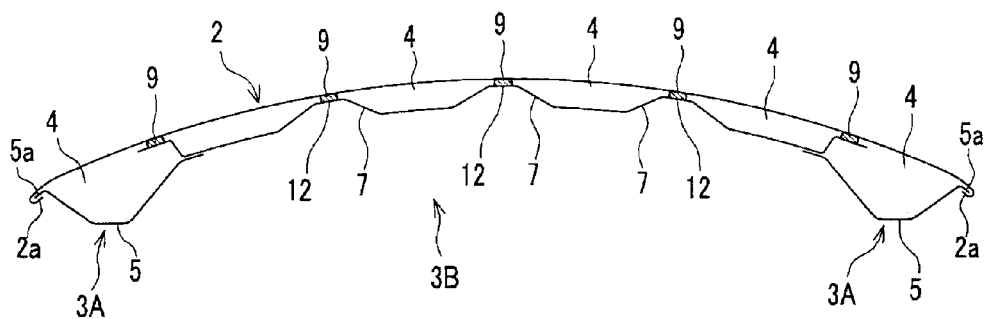

The automobile hood of the invention may be an automobile hood 1F in which a large number of conical convex portions (truncated cones, diameter of bottom: 60 to 180 mm) is disposed at predetermined intervals (80 to 210 mm) on a surface of the second inner member 3B and concave portions formed among the convex portions are set as second inner concave portions 7 as shown in FIGS. 10(a) through 10(c). The convex portion of the automobile hood 1F is preferable to have a height in a range from 3 to 30 mm. The rigidity of the automobile hood 1F and the pedestrian protection performance tend to drop when the diameter of the bottom of the convex portion, the intervals among the convex portions and the height of the convex portion are out of those ranges.

If the rigidity of the automobile hood 1F and the pedestrian protection performance are on the satisfactory level, small and large convex portions having several kinds of heights may be used corresponding to the space under the hood or to the rigidity of the built-in parts disposed under the hood. Not only the same diameter and the same intervals, but also different diameter and intervals may be set as the diameter of the convex portion (diameter of the bottom) and the intervals among the convex portions.

In the case of the automobile hood 1F, a top of the convex portion may be arranged as a panel joint portion 12 and a bonding portion 9 such as a resin layer may be disposed on the panel joint portion 12. Then, the outer panel 2 is joined (bonded) with the second inner member 3B (the inner panel 3) via the bonding portion 9 to create airspace portions 4 between the both panels 2 and 3.

Figure 11A:
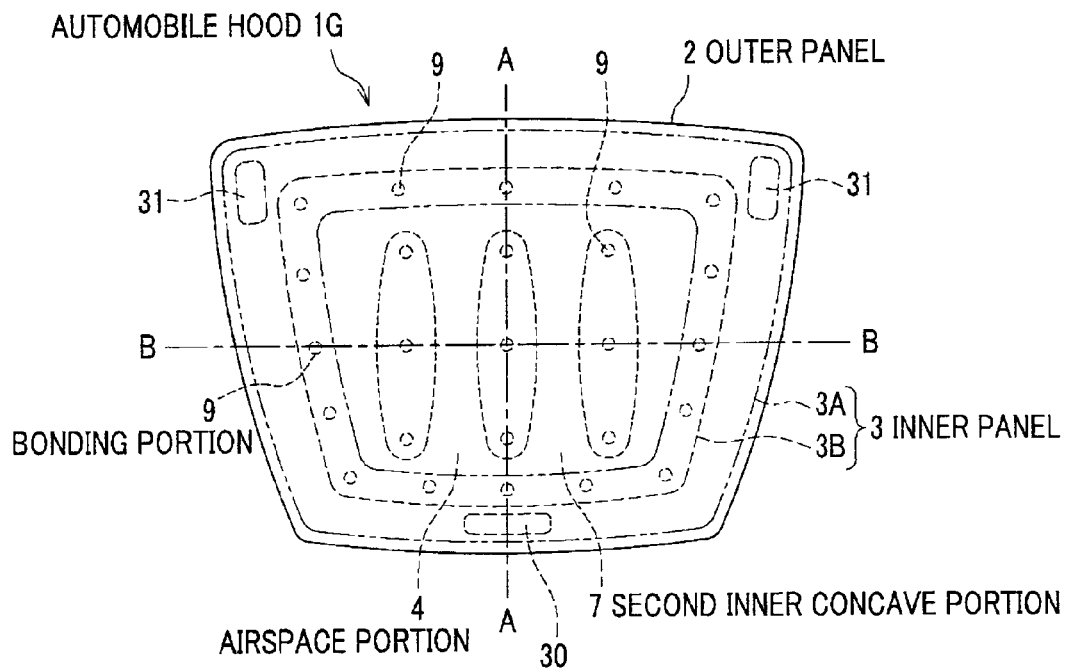
FIG. 11(a) is a plan view showing a still other configuration of an automobile hood.
Figure 11B:
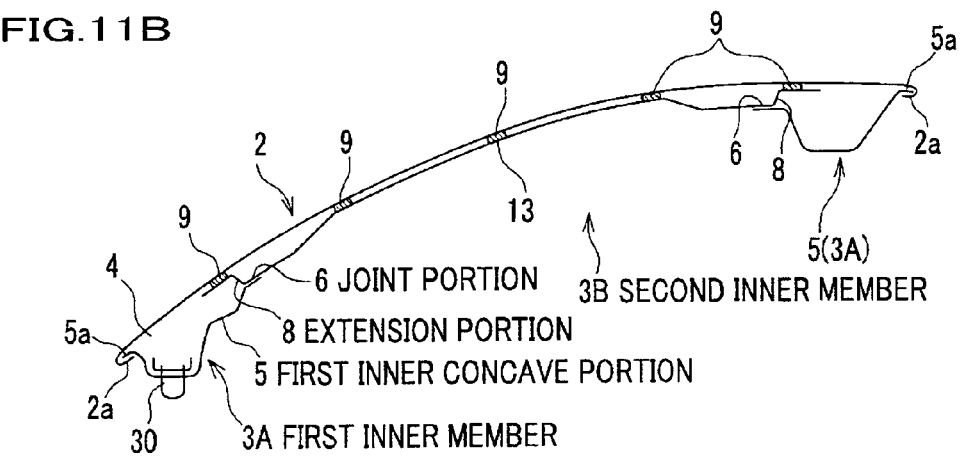
FIG. 11(b) is an end elevational view taken along a line A-A in FIG. 11(a) and FIG. 11(c) is an end elevational view taken along a line B-B in FIG. 11(a).
Figure 11C:
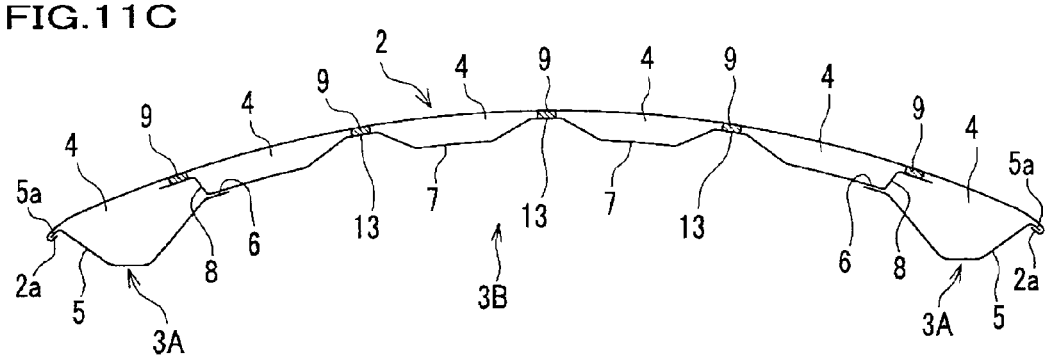

The automobile hood of the invention may be an automobile hood 1G in which a plurality of wavy beads (convex portions) heading in the vehicle longitudinal direction (direction of a line A-A) of the second inner member 3B (the inner panel 3) is disposed substantially in parallel from each other on the surface of the second inner member 3B as shown in FIGS. 11(a) through 11(c) and concave portions formed among the wavy beads (convex portions) are arranged as second inner concave portions 7. Then, it is preferable to have a sectional shape that continues in a shape of a sine wave or of a sine n-power wave in the vehicle width direction (direction of a line B-B) by the wavy beads (convex portions) and the second inner concave portions 7. Preferably, the wave has a height in a range from 3 to 30 mm and a wavelength in a range from 80 to 220 mm. When the height and wavelength of the wave are out of these ranges, the rigidity of the automobile hood 1G and the pedestrian protection performance tend to drop.

If the rigidity of the automobile hood 1G and the pedestrian protection performance are on the satisfactory level, the arrangement direction of the wavy beads is not limited to be parallel with the vehicle longitudinal direction (the direction of the line A-A). For instance, the arrangement direction may be oblique to the vehicle longitudinal direction or may be concentric, including an elliptical shape, substantially centering on a center of the second inner member 3B. Still more, two kinds of wavy beads may be disposed in parallel with or orthogonally from each other in the vehicle longitudinal direction or the vehicle width direction or may be disposed in a shape of V (shape of U) so as to form into a shape of double-wave. Further, although a width (wavelength) of the wavy beads is changed within a predetermined range in FIG. 11(a), the wavy beads may be formed with the same width.

In the case of the automobile hood 1G, a top of the wavy bead is arranged as a panel joint portion 13 and a bonding portion 9 such as a resin layer is disposed on the automobile hood 13. Then, the outer panel 2 is joined (bonded) with the second inner member 3B (the inner panel 3) via the bonding portion 9 to create airspace portions 4 between the both panels 2 and 3.

The second inner member 3B may be constructed by a porous plate in which a large number of holes for absorbing sounds is provided in the automobile hood 1F (see FIGS. 10(a) through 10(c)) or in the automobile hood 1G (see FIGS. 11(a) through 11(c)).

As described above, the following effects may be obtained by the automobile hoods of the first embodiment.

Because the inner panel is composed of the two parts of the first and second inner members, the first inner member has the first inner concave portion and the second inner member has the second inner concave portion, the panel joint portion and the extension portion, the automobile hood meets the basic performances (tensile rigidity, dent resistance, bending stiffness, torsional stiffness and the like) as an automobile hood and excels in the pedestrian protection performance by reducing the HIC value at the center part and the peripheral part of the automobile hood. Still more, a degree of freedom of design for optimizing the pedestrian protection performance may be increased because the material and thickness of the second inner member, beside the first inner member, may be determined corresponding to the required performance of the automobile hood.

Still more, because the extension portion of the second inner member is formed so as to have the predetermined width and its area is thus reduced, the automobile hood may be lightened and its product cost may be cut.

Further, the second inner member has the flange portion extending out of the extension portion, the HIC value may be reduced further and the pedestrian protection performance may be improved further.

Second Embodiment

Next, a second embodiment of the automobile hood of the invention will be explained with reference to the drawings. It is noted that the same components already explained will be denoted by the same reference numerals and the explanation thereof will be omitted here.

Figure 12A:
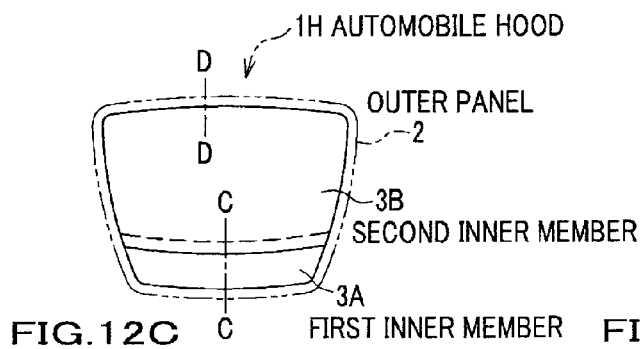
FIG. 12(a) is a plan view diagrammatically showing another configuration of an automobile hood.
Figure 12B:
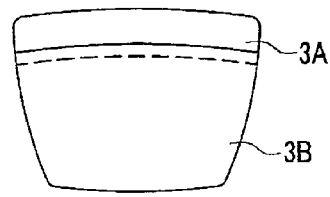
FIGS. 12(b) through (h) are plan views diagrammatically showing other configurations of an inner panel.
Figure 12C:
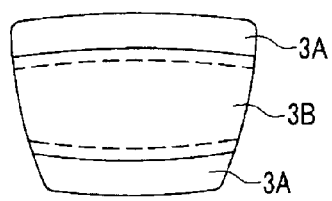
Figure 12D:
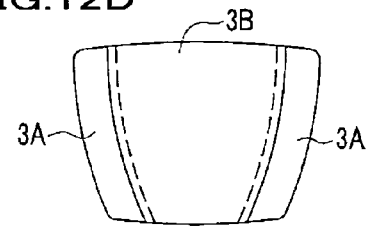
Figure 12E:
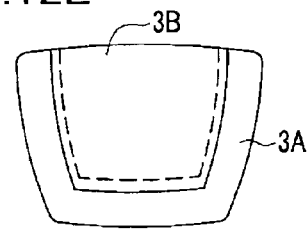
Figure 12F:
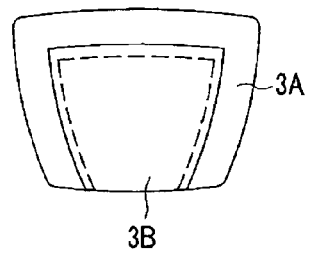
Figure 12G:
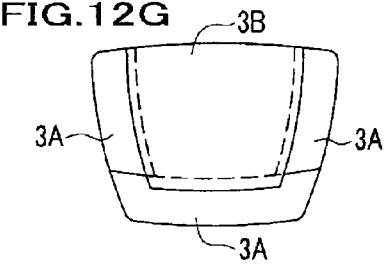
Figure 12H:
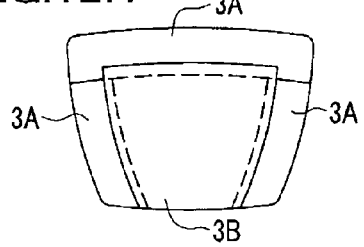
Figure 12I:
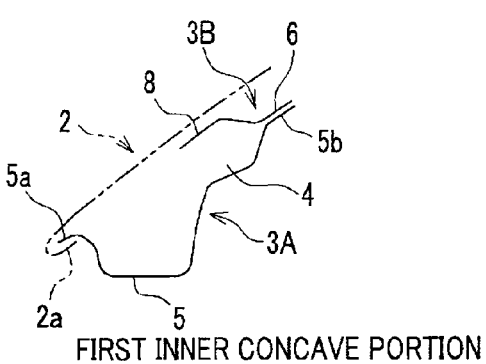
FIG. 12(i) is an end elevational view taken along a line C-C in FIG. 12(a) and FIG. 12(j) is an end elevational view taken along a line D-D in FIG. 12(a).
Figure 12J:
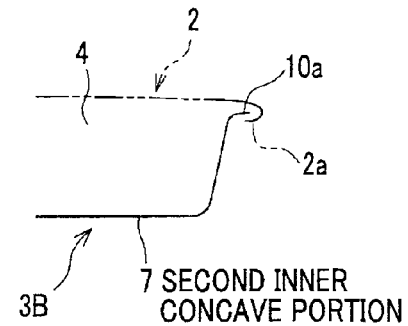
Figure 13A:
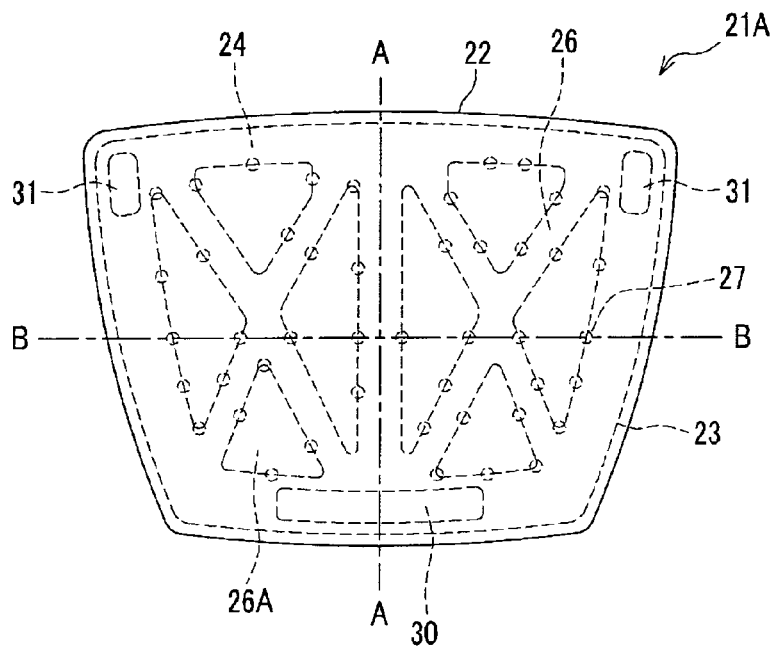
FIG. 13(a) is a plan view showing a configuration of a prior art automobile hood.
Figure 13B:
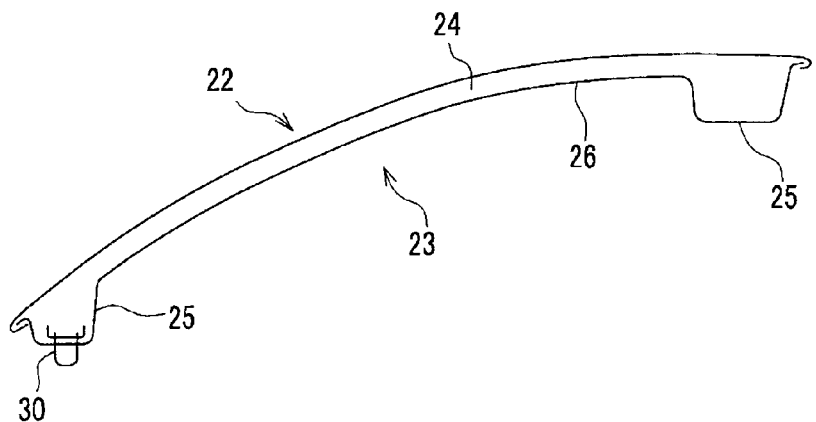
FIG. 13(b) is an end elevational view taken along a line A-A in FIG. 13(a) and FIG. 13(c) is an end elevational view taken along a line B-B in FIG. 13(a).
Figure 13C:
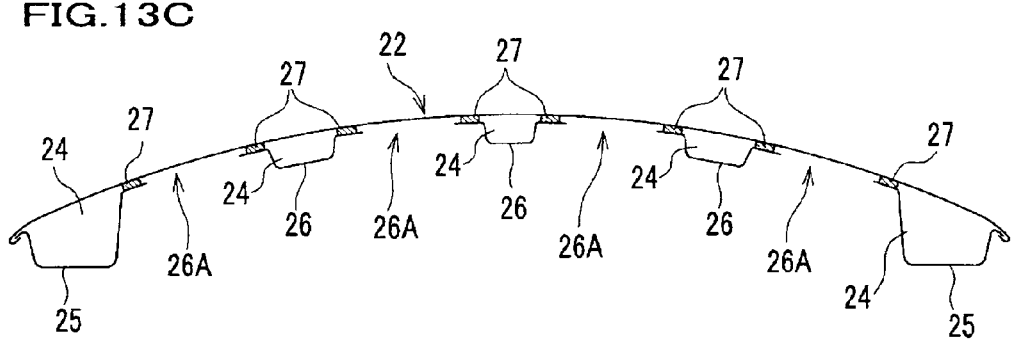
Figure 14A:
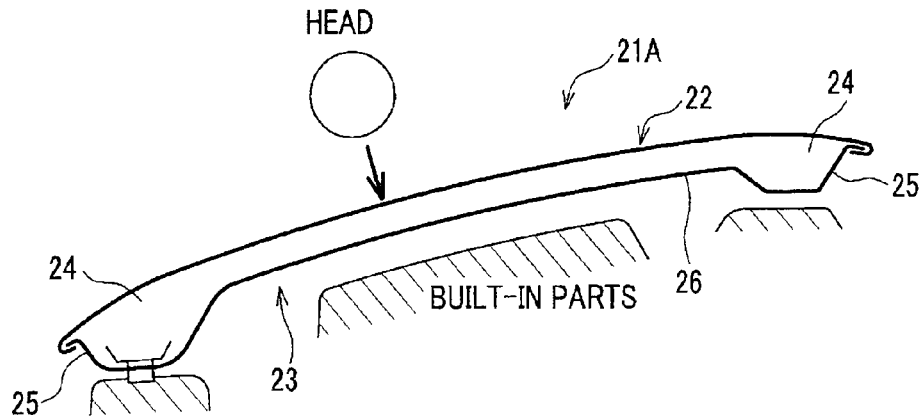
FIG. 14(a) is a diagrammatic view explaining a state when the head collides against a prior art automobile hood.
Figure 14B:
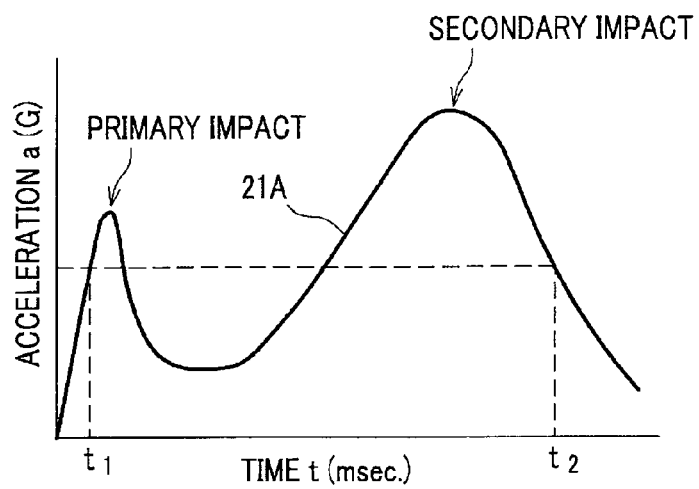
FIG. 14(b) is a graph explaining a relationship between accelerations a and time when the head collides against the automobile hood and FIG. 14(c) is a graph explaining a relationship between the accelerations a and strokes.
Figure 14C:
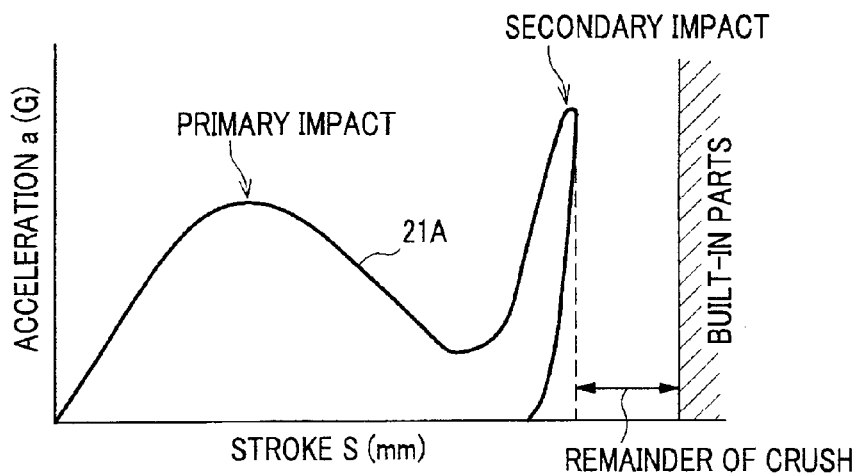
Figure 15A:
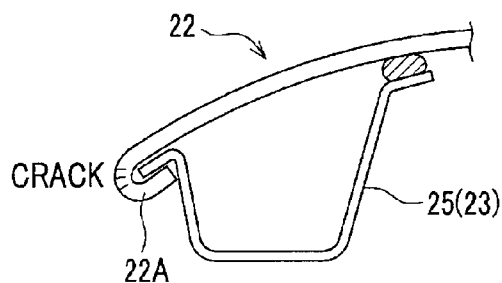
FIGS. 15(a) and 15(b) are end elevational views of a first inner concave portion showing exemplary measures of the prior art automobile hood.
Figure 15B:
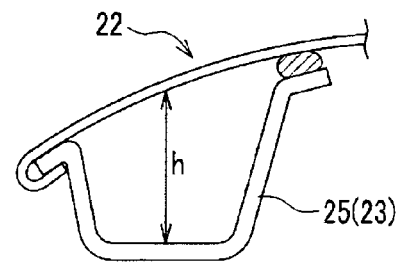
Figure 15C:
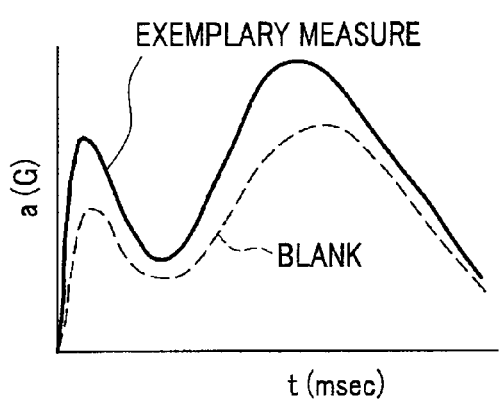
FIG. 15(c) is a graph explaining a relationship between accelerations and time when the head collides against the automobile hood in FIG. 15(b)
Figure 15D:
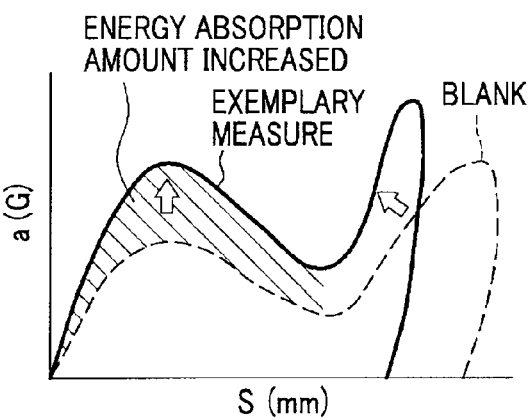
FIG. 15(d) is a graph explaining a relationship between the accelerations and strokes when the head collides against the automobile hood in FIG. 15(*b*) and FIG. 15(*e*) is an end elevational view of the first inner concave portion showing another exemplary measure of the prior art automobile hood.
Figure 15E:
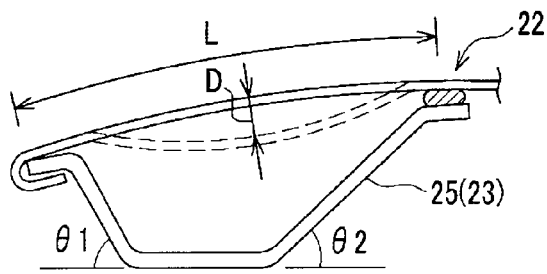
Figure 16A:
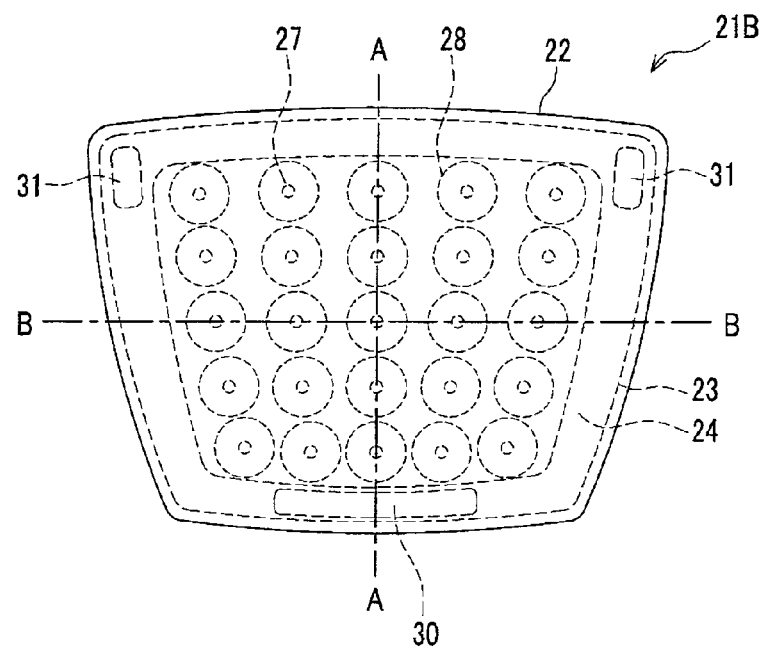
FIG. 16(*a*) is a plan view showing another configuration of a prior art automobile hood, FIG. 16(*b*) is an end elevational view taken along a line A-A in FIG. 16(*a*) and FIG. 16(*c*) is an end elevational view taken along a line B-B in FIG. 16(*a*).
Figure 16B:
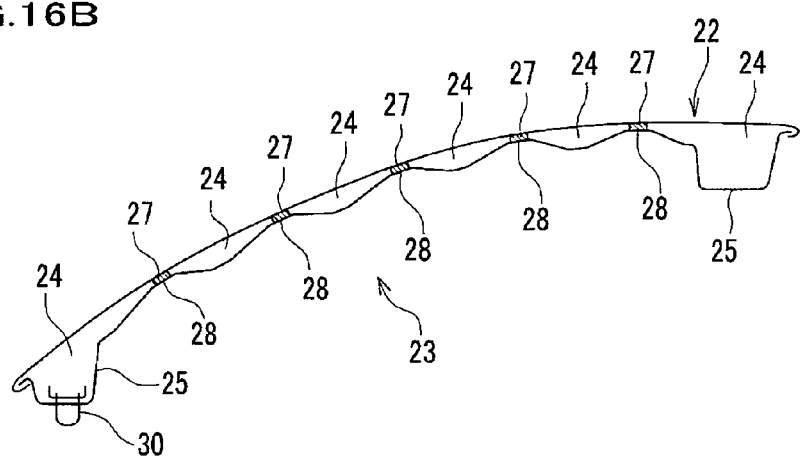
Figure 16C:
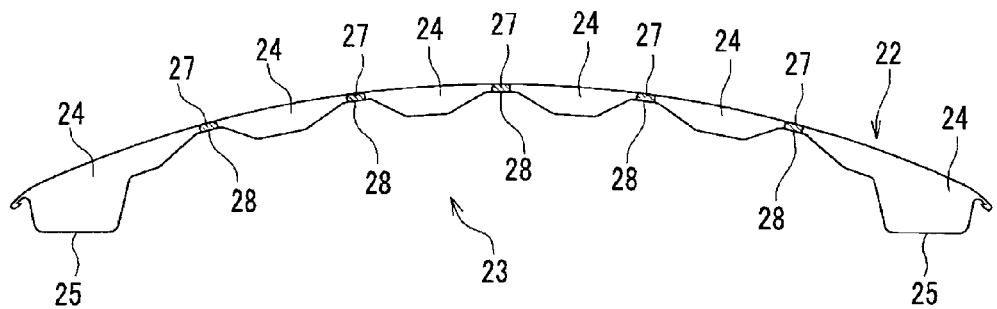
Figure 17A:
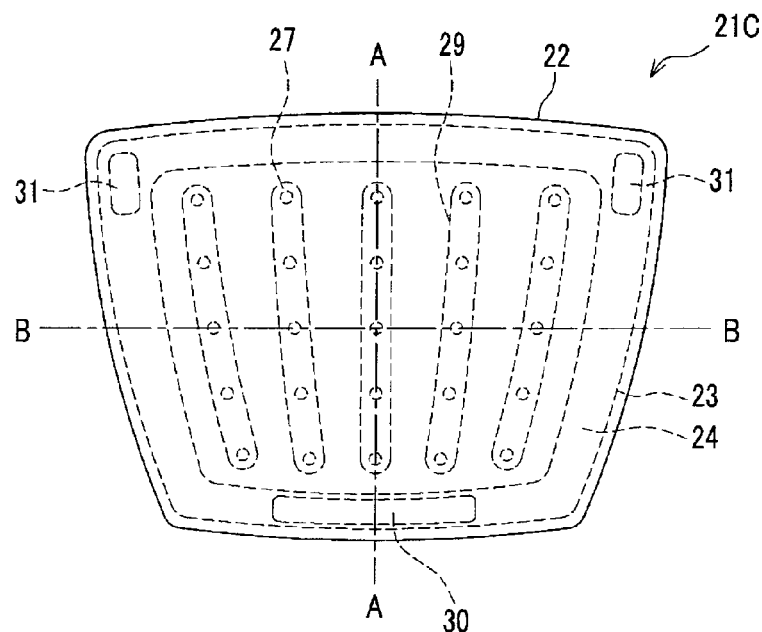
FIG. 17(*a*) is a plan view showing a still other configuration of a prior art automobile hood, FIG. 17(*b*) is an end elevational view taken along a line A-A in FIG. 17(*a*) in and FIG. 17(*c*) is an end elevational view taken along a line B-B in FIG. 17(*a*).
Figure 17B:
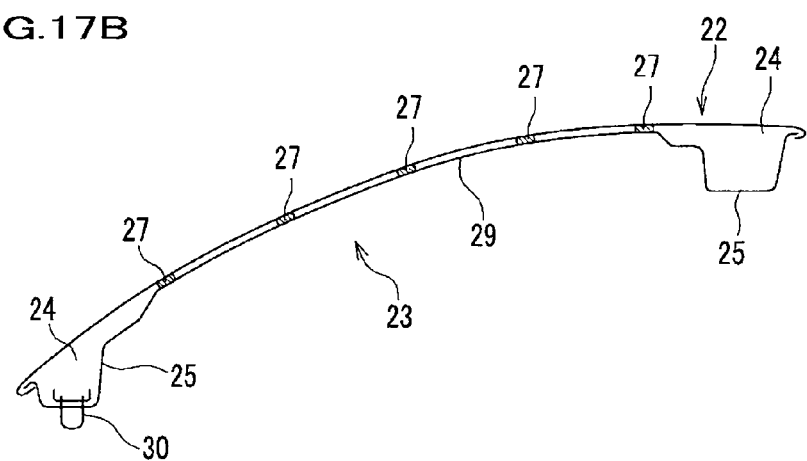
Figure 17C:
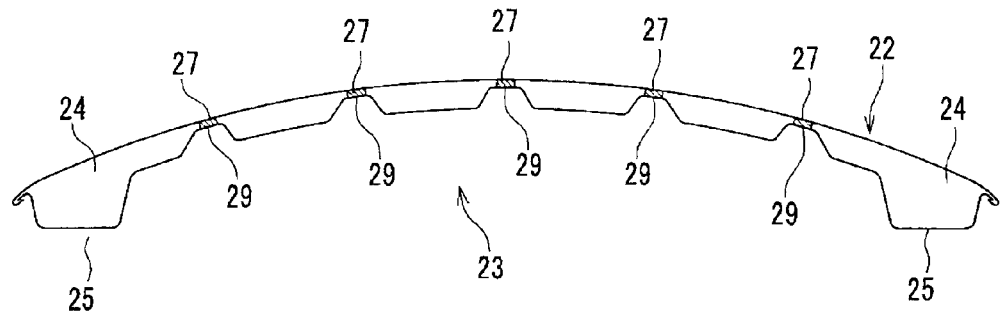

As shown in FIGS. 12(a), 12(i) and 12(j), an automobile hood 1H of the invention has a cross-sectional structure in which the outer panel 2 is joined with the inner panel 3 (the first inner member 3A, the second inner member 3B) and the airspace portion 4 is interposed between the predetermined position when the both panels are joined in the same manner with the first embodiment.

<Outer Panel>

The outer panel 2 is joined with the peripheral part of the inner panel described later at the peripheral part thereof by means of fitting such as hem processing and has a cross-sectional structure interposing an airspace portion 4 between predetermined position of the outer and inner panels. Here, the material and thickness of the outer panel 2 are the same with those of the first embodiment.

<Inner Panel>

The inner panel is composed of a first inner member 3A (disposed on a front side of the vehicle longitudinal direction in FIG. 12(a)) that has a concave sectional shape and that joins with a part (one side in FIG. 12(a)) of a peripheral part of the outer panel 2 and a second inner member 3B that is disposed on the side closer to the panel center than the first inner member 3A and that joins with the first inner member 3A and the outer panel 2 (the panel center part and the remaining three sides of the peripheral part of the outer panel 2 in FIG. 2(a)). Here, the material and thickness of the inner panel are the same with those of the first embodiment.

<First Inner Member>

The first inner member 3A includes an outer edge portion 5a that joins with a part of the peripheral portion 2a of the outer panel 2 (one side in FIG. 12(a)), a first inner concave portion 5 that is formed continuously from the outer edge portion 5a and that forms a airspace portion 4 between the outer panel 2 and an inner edge portion 5b that is formed continuously from the first inner concave portion 5 and that joins with the second inner member 3B. Here, the joint of the peripheral portion 2a with the outer edge portion 5a, the joint of the inner edge portion 5b with the second inner member 3B (the joint portion 6), the thickness of the first inner member 3A and the shape of the first inner concave portion 5 (sectional height) are the same with those of the first embodiment.

<Second Inner Member>

The second inner member 3B includes a second inner concave portion 7 having the joint portion 6 that joins with the inner edge portion 5b of the first inner member 3A and creating the airspace portion 4 between the outer panel 2, an edge portion 10a that is continuously formed from the second inner concave portion 7 and that joins with the other remaining peripheral part 2a of the outer panel 2 (the three sides of the peripheral part not joined with the first inner member 3A in FIG. 12(a)), a panel joint portion that joins with the outer panel 2 at position closer to the panel center side than the joint portion 6 (not shown. See FIGS. 1(c), 10(c) and 11(c) because this is the same with that of the first embodiment) and an extension portion 8 that is continuously formed from the joint portion 6 and that extends into the first inner concave portion 5 to join with the outer panel 2.

Here, although it is preferable to mechanically join the peripheral portion 2a of the outer panel 2 with the panel joint portion 10a, e.g., by means of the hem processing, they may be joined by means of welding or bonding by a resin layer or the like. The panel joint portion, the joint of the extension portion 8 with the outer panel 2, the bonding position of the extension portion 8, the thickness of the second inner member 3B and the shape (sectional height) of the second inner concave portion 7 are the same with those of the first embodiment. The second inner concave portion 7 may be also anyone of the concave beam, the conical convex portion and the concave portion formed by the wavy beads described in the first embodiment (see FIGS. 1, 10 and 11).

As described above, the automobile hood 1H is characterized in that the first inner member 3A and the second inner member 3B composing the inner panel are arranged so that the both of the peripheral parts of the both inner members 3A and 3B join with the peripheral part of the outer panel 2 and that the first inner member 3A has no frame shape. Only the frame-shaped first inner member 3A joins with the peripheral part of the outer panel 2 in the automobile hoods 1A through 1G of the first embodiment.

The joint arrangement of the both inner members 3A and 3B is not limited to the joint arrangement shown in FIG. 12(a) and may adopt the following joint arrangements. FIGS. 12(b) through (h) show exemplary modifications of the inner panel (the first inner member 3A, the second inner member 3B), wherein a description of the outer panel 2 is omitted.

FIG. 12(b) shows an inner panel in which a second inner member 3B is joined with a strip-like first inner member 3A disposed on a rear side (on a side of a driver's seat) in the vehicle longitudinal direction, wherein the first inner member 3A joins with one side of the peripheral part of the outer panel and the second inner member 3B joins with the remaining three sides of the peripheral part.

FIGS. 12(c) and 12(d) show an inner panel in which a second inner member 3B is joined with two strip-like first inner members 3A disposed on front and rear sides in the vehicle longitudinal direction or on both sides in the vehicle width direction, wherein the first inner member 3A joins with two sides of the peripheral part of the outer panel and the second inner member 3B joins with the remaining two sides of the peripheral part.

FIGS. 12(e) and 12(f) show an inner panel in which a second inner member 3B is joined with a U-shaped first inner member 3A disposed on a front side or a rear side in the vehicle longitudinal direction, wherein the first inner member 3A joins with three sides of the peripheral part of the outer panel and the second inner member 3B joins with the remaining one side of the peripheral part. It is also possible to use a tailored blank member formed by joining three strip-like first inner members as the U-shaped first inner member 3A.

FIGS. 12(g) and 12(h) show an inner panel in which a second inner member 3B is joined with three strip-like first inner members 3A disposed on a front side or a rear side in the vehicle longitudinal direction and on the both sides in the vehicle width direction, wherein the first inner member 3A joins with three sides of the peripheral part of the outer panel and the second inner member 3B joins with the remaining one side of the peripheral part.

The automobile hood 1H may be an automobile hood that includes the extension portion 8 having the predetermined width (see FIG. 6(a)) in the same manner with the first embodiment. The automobile hood 1H may be an automobile hood that includes the flange portion 11 (see FIG. 7(a)) formed by rising from the extension portion 8. Still more, it may be an automobile hood in which the thickness of the second inner member 3B is differentiated from the thickness of the first inner member 3A. It is also noted that when the plurality of first inner members 3A is used (see FIGS. 12(c), 12(d), 12(g) and 12(h)), their thickness may be differentiated.

INDUSTRIAL APPLICABILITY

As described above, the following effects may be obtained by the automobile hood of the second embodiment.

That is, because the first inner member is not formed into the shape of a frame and the material of the first inner member incurs less waste, the product cost of the automobile hood may be cut while having the effects of the first embodiment.

The invention claimed is:

1. An automobile hood constructed by joining a peripheral part of an outer panel with a peripheral part of an inner panel and having a cross-sectional structure in which airspace portions are interposed at predetermined positions between the both panels when the peripheral parts of the both panels are joined:

wherein said inner panel includes a frame-shaped first inner member that is joined with the peripheral part of said outer panel and has a concave sectional shape and a second inner member that is disposed within the frame of said first inner member, joined with said first inner member on one side and joined with said outer panel on the other side;

said first inner member includes an outer edge portion that joins with the peripheral part of said outer panel, a first inner concave portion that is formed continuously from said outer edge portion and forms said airspace portion between said outer panel and said first concave portion and an inner edge portion that is formed continuously from said first inner concave portion and joins with said second inner member; and said second inner member has second inner concave portions that have joint portions that join with the inner edge portion of said first inner member and forms said airspace portions between said outer panel and said second inner concave portions, panel joint portions that join with said outer panel at positions on a side closer to a center of the panel than the joint portion and an extension portion that is formed continuously from said joint portion and extends into said first inner concave portion to join with said outer panel.

2. The automobile hood according to claim 1, wherein the extension portion of said second inner member extends from said joint portion with a predetermined width.

3. The automobile hood according to claim 1, wherein said second inner member is continuously formed from said extension portion by raising at a predetermined angle to have a flange portion that extends to the peripheral part side of said outer panel.

4. An automobile hood constructed by joining a peripheral part of an outer panel with a peripheral part of an inner panel and having a cross-sectional structure in which airspace portions are interposed at predetermined positions between the both panels when the peripheral parts of the both panels are joined:

wherein said inner panel includes a first inner member that is joined with a part of the peripheral part of said outer panel and has a concave sectional shape and a second inner member that is disposed on the side closer to the center of the panel than said first inner member and joins with said first inner member and said outer panel;

said first inner member includes an outer edge portion that joins with a part of the peripheral part of said outer panel, a first inner concave portion that is formed continuously from said outer edge portion and forms said airspace portion between said outer panel and said first inner concave portion and an inner edge portion that is formed continuously from said first inner concave portion and joins with said second inner member; and said second inner member has second inner concave portions that have joint portions that join with the inner edge portion of said first inner member and form said airspace portions between said outer panel and said second inner concave portions, an edge portion that is formed continuously from said second inner concave portion and joins with other remaining peripheral parts of said outer panel, panel joint portions that join with said outer panel at position on the side closer to a center of the panel than the joint portion and an extension portion that is formed continuously from said joint portion and extends into said first inner concave portion to join with said outer panel.

5. The automobile hood according to claim 4, wherein the extension portion of said second inner member extends from said joint portion with a predetermined width.

6. The automobile hood according to claim 4, wherein said second inner member is continuously formed from said extension portion by raising at a predetermined angle to have a flange portion that extends to the peripheral part side of said outer panel.

* * * * *